United States Patent [19]

Silberbauer et al.

[11] Patent Number: 5,355,493
[45] Date of Patent: Oct. 11, 1994

[54] SYSTEM FOR ENCODING UNITS OF ENTITY/RELATIONSHIP DATA TO INCLUDE PREFIXES WITH CODES FOR LENGTH, ACTION, AND UNIT IDENTIFIER

[75] Inventors: Amy M. Silberbauer, Modesto; Susanne J. Tabari, Los Gatos, both of Calif.

[73] Assignee: International Business Machines Corporation, Armonk, N.Y.

[21] Appl. No.: 796,117

[22] Filed: Nov. 20, 1991

[51] Int. Cl.⁵ .................. G06F 15/40; G06F 15/38
[52] U.S. Cl. .................... 395/700; 364/282.1; 364/280.4; 364/974.4; 364/974.5; 364/966; 364/DIG. 2; 395/600; 341/50
[58] Field of Search .................. 395/600, 650, 700; 382/41, 56; 341/50

[56] References Cited

U.S. PATENT DOCUMENTS

| | | | |
|---|---|---|---|
| 4,160,877 | 7/1979 | Vander Mey | 179/15 |
| 4,464,650 | 8/1984 | Eastman et al. | 340/347 |
| 4,558,302 | 12/1985 | Welch | 340/347 |
| 4,729,096 | 3/1988 | Larson | 364/300 |
| 4,748,638 | 5/1988 | Friedman et al. | 375/8 |
| 4,876,541 | 10/1989 | Storer | 341/51 |
| 5,019,961 | 5/1991 | Addesso et al. | 364/192 |
| 5,051,886 | 9/1991 | Kawaguchi et al. | 364/200 |

OTHER PUBLICATIONS

IBM Repository Manager/MVS General Information ver. 1 rel. 2, 2/e 1990 pp. 17–24.

*Primary Examiner*—Thomas C. Lee
*Assistant Examiner*—Peter Y. Wang
*Attorney, Agent, or Firm*—George M. Knight

[57] ABSTRACT

A method is described for encoding and decoding stored units of data representing entity/relationship (E/R) data, function calls, and file data by including a prefix with each unit of data which includes a length code, an action code, and a unit identifier code. The data units with prefixes are organized into a data stream by using rules described in a formal grammar. The data stream will typically be transmitted to another program inside the computer or to another computer—host or PWS. When received the data stream is parsed back into data units by reversing the encoding process. After the data units are recovered the appropriate action is taken to process the units. E/R data is entered into or updated in a repository, function calls are passed on to an E/R repository function or other program along with the specified parameters for execution, and file data is stored in standard files. Generated output is captured, encoded into a data stream and transmitted back to requesting PWS which then parses the data stream to recover the output data.

9 Claims, 4 Drawing Sheets

SYSTEM FOR ENCODING UNITS OF ENTITY/RELATIONSHIP DATA TO INCLUDE PREFIXES WITH CODES FOR LENGTH, ACTION, AND UNIT IDENTIFIER

FIELD OF THE INVENTION

The present invention relates to systems and methods for encoding, decoding, moving and manipulating computerized data and more particularly data relating to entities and relationships.

BACKGROUND OF THE INVENTION

As used in the field of this invention, entities and relationships are special forms of data that are intended to represent information that is useful in the process of designing and writing computer programs. When this information is stored in a retrievable manner it can be used to aid in the development of computer programs. There are various commercial software systems available which are specially designed to manipulate entity/relationship (E/R) data. One of these systems is IBM's Repository Manager (RM). RM is a predominantly host computer based program. Users of RM may enter their data manually using dialog panels or custom programs may be developed to create, update and retrieve the data. RM provides a set of callable functions which can be accessed by other programs. New RM functions can be created by users as well. These callable functions typically require one or more parameters to perform correctly. It is standard practice in the industry for users to have a personal computer or programmable workstation (PWS) which is used to interface with host computer based programs. When the PWS is sharing the workload with the host, the system is said to be "cooperative". Many kinds of data, not only E/R data, are stored in files. These files may be located on either the host or the PWS.

There is a need for efficient ways to encode E/R data, function calls, and file data in a format which can be transmitted between a PWS and another computer.

Packaging data in a data format of self-describing units is known in the art. The use of grammars as a way of precisely defining syntax is also well known. An efficient comprehensive grammar for self-describing data stream of E/R related data which meets the described need is not found in the prior art.

SUMMARY OF THE INVENTION

The invention provides method and means for encoding and decoding stored units of data representing entity/relationship data, function calls, and file data by including a prefix with each unit of data which includes a length code, an action code, and a unit identifier code. The data units with prefixes are built into a data stream by using rules described in a formal grammar. The data stream call be stored in temporary or permanent storage in the computer. It may be transmitted to another program on the same computer or to another computer—host or PWS. When received the data stream is parsed back into data units by reversing the encoding process. After the data units are recovered the appropriate action may be taken to process the units. E/R data may be entered into or updated in a repository, function calls may be passed on to the appropriate functions along with the specified parameters for execution, and file data may be stored. Generated output data is captured, encoded and returned to the requesting system as a data stream which must be parsed.

DETAILED DESCRIPTION OF THE INVENTION

The invention is embodied in a larger system which will be called the Entity/Relationship Data Movement and Manipulation tool (EDMM) which is designed for use with IBM's Repository Manager/MVS. The invention is, however, independent of the particular host tool used as the repository for the E/R data. EDMM has five components. The first four components described are run-time facilities; the fifth, PF, is used during development. Each of these components is described in detail in later sections. They are:

1. Common Data Format (CDF): EDMM's common data interchange format, which is a means of consistently representing E/R, file record data and function call information within a data stream.
2. Builder: The function that creates a CDF data stream from E/R, file record and function call data.
3. Parser: The function that interprets and decodes information in a CDF data stream.
4. Communication Facility (CF): The function which provides data transfer and remote function routing between work station and host platforms.
5. Productivity Facility (PF): The facility for creating Repository Manager data handling functions based on the work station tool's view of the E/R data.

Figure 1:
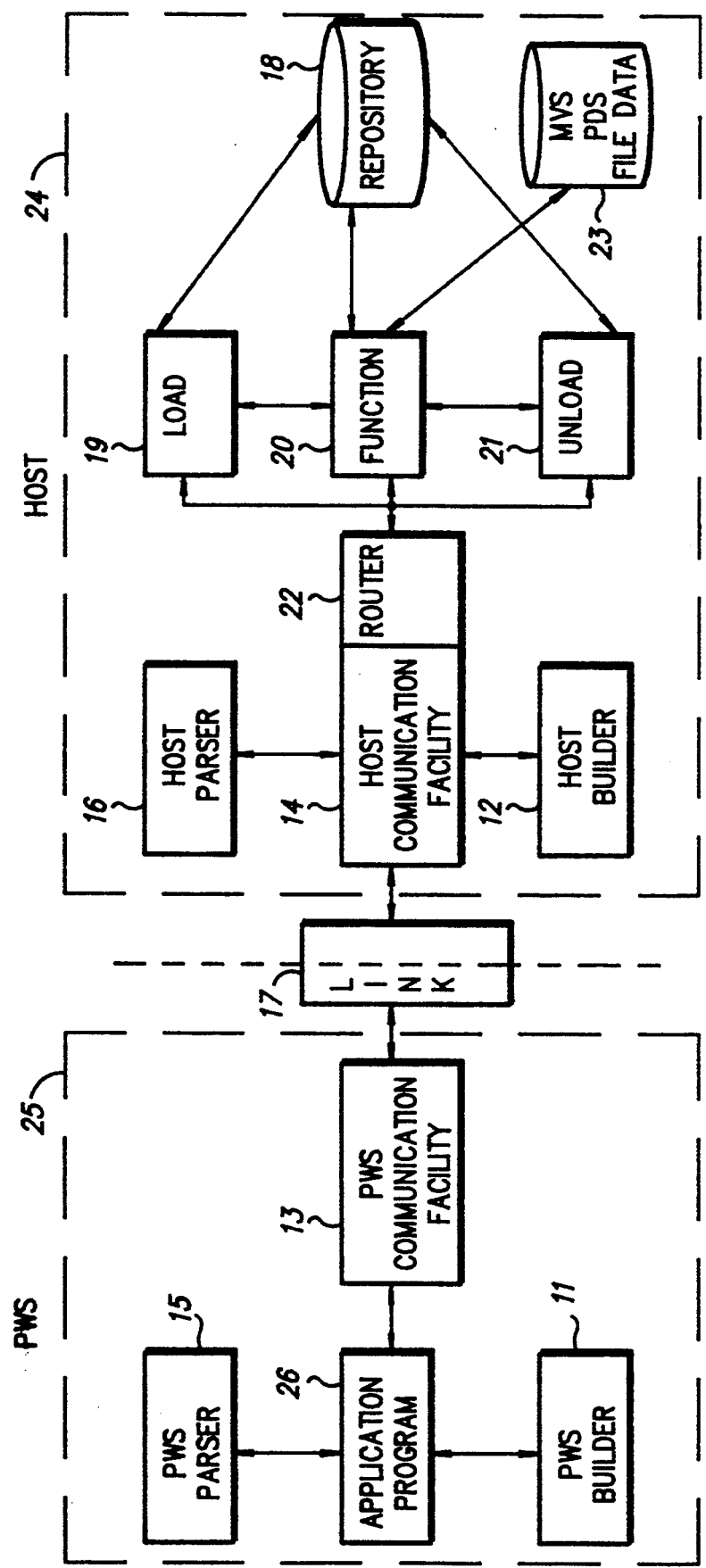
FIG. 1 shows the block structure of a PWS and host using the invention.

The overall structure of a host connected PWS system using the invention is shown in FIG. 1. The invention can be used in any system requiring transmission or storage of E/R related data. Thus, a PWS to PWS or host to host connection will work, as will any combination of networked computers. The operation of the system is controlled by a user supplied Application Program 26 which supplies the data and commands for the components of EDMM. The components of the invention are an EDMM Builder, Parser, and Communication Facility. The PWS Builder 11 is required to encode the raw units of data into a formatted data stream. The PWS Parser 15 decodes a formatted data stream. The PWS Communication Facility (CF) 13 provides the high level interface to a standard computer-to-computer communication means 17. Host Builder 12, Host Parser 16, and Host Communication Function 14 provide similar function on the host side, but the internals may be different because the host computer may have an instruction set or operating system that is different than that of the PWS. The Host Communication Function also includes a Router 22, which provides means to detect the presence of and appropriately route the E/R data, function calls, and file data in the data stream. The Function means 20 may be a part of EDMM, may be supplied as a part of a system such as the Repository Manager and/or may include functions supplied by the operating system. E/R data from the PWS is routed to Load means 19. The Unload means 21 is used to retrieve E/R data from the repository and return it to the PWS. The E/R data is stored in the repository means 18 such as is provided through IBM's Repository Manager/MVS. File data is stored in whatever standard way is provided by the operating system such as an MVS partitioned data set (PDS) 23. The Load, Unload, and other Functions may generate output which is captured and routed back to the PWS through the link.

A CDF data stream consists of units of binary and character data. Each unit contains a self-describing prefix area followed by a variable-length data area that might contain other nested units. The prefix area contains a 4-byte length field, a 1-byte action field, and a 1-byte unit identifier field. The data area may or may not contain data depending upon the type of unit being described.

The CDF data stream is supported by two functions, the Parser and the Builder, which exist on both the work station and the host. These functions provide users with an external view of a CDF data stream by dealing with the complexities of the CDF as well as ensuring the syntactical correctness of the data stream. Any function that deals with a CDF data stream must go through the Builder and Parser. The purpose of the Builder is to build a CDF data stream one unit at a time. The purpose of the Parser function is to retrieve data one unit at a time from a CDF data stream. It allows the user to interpret data in the CDF.

The Communication Facility is the component of the EDMM Tool that allows the communication of remote function calls and other information between work station tools and host-based Repository Manager Functions. This component relies on RM/PWS, which is supplied with the Repository Manager, to communicate between the host and the work station. A tool on the work station invokes the CF function on the work station, passing it a CDF data stream containing function call information and any other data necessary to invoke that function. The Host CF interprets the CDF data stream and routes the function calls to the appropriate host Repository Manager function. After the Repository Manager function(s) have executed, the output parameters and processing results are returned to the work station tool in another CDF data stream.

The Productivity Facility(PF) is the component that enables the rapid creation of data manipulation functions based on a variety of views of E/R data in the repository. The PF creates Repository Manager data handling C-language functions, as described below, for any configuration of entities and relationships defined by the user.

Unload

A function that retrieves a group of connected entities and relationships from the repository and translates the entity, attribute, and relationship information via the Builder function into a CDF data stream.

Load

A function that interprets a CDF data stream containing entity, attribute, and relationship information, updating the repository as specified by the action field of each CDF unit.

Delete

A function that deletes a group of connected entity and relationship instances from the repository.

Copy

A function that copies a group of connected entity and relationship instances in the repository.

To create an Repository Manager function using PF, the tool builder must first fully define the function to Repository Manager, and generate the Repository Manager function report. The generated Repository Manager report is input to the Productivity Facility, which produces the desired Repository Manager C-language Function based on the tool builder's view of the E/R data. A fully defined Repository Manager function includes the definition of templates and connections.

EDMM Run-time Scenario

Figure 2:
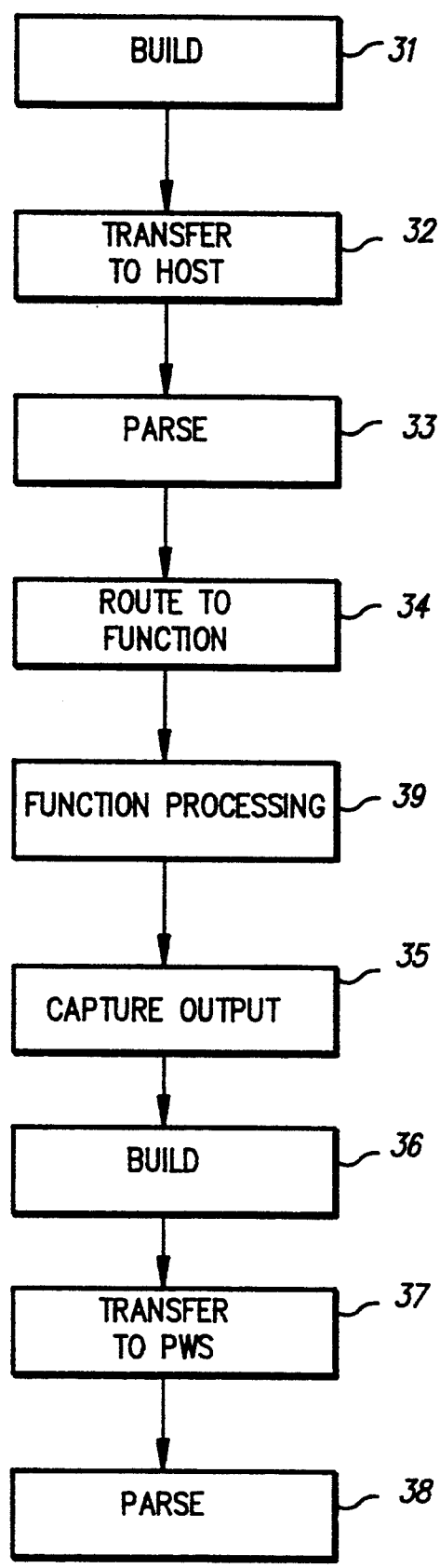
FIG. 2 shows the overview of the steps involved in executing a function call using the invention.

FIG. 2 will be used to illustrate the overall process of how a work station application and the host interact when the arbitrary function, which will be called FUNCTION_X, on the host is called from the work station. This scenario can easily be generalized for any activity requested by the application on the work station.

The scenario is as follows:

1. The application on the work station uses the Builder function to build a CDF data stream, specifying the FUNCTION_X function to be invoked on the host along with FUNCTION_X's input parameter values 31. The data stream may be stored temporarily (in RAM) or more permanently on disk or tape.

2. The application on the work station transmits the data stream to the host by invoking CF on the work station using a regular C function call, passing a pointer to the CDF data stream as input 32. If the host uses a character set which is different from the PWS, then a character set translation is performed by the PWS CF before the data is transmitted.

3. The CF function on the work station transfers the CDF data to the CDF counterpart on the host.

4. After parsing the data stream 33, the routing is performed 34 based on the FUNCTION_X function call information in the CDF data stream, the CF router function on the host sets up the appropriate FUNCTION_X parameter template with input parameter values from the data stream and invokes the FUNCTION_X host Repository Manager function.

5. The FUNCTION_X function processes.

6. Upon completion, the FUNCTION_X function sets the output parameter values and returns to the host CF function with its output parameters in the FUNCTION_X Repository Manager parameter template 35. Some functions might only generate a return code, but the return code will be processed through the builder the same as other types of data.

7. The CF function on the host takes output parameters From FUNCTION_X's parameter template and, using the Builder function 36, places them back into the CDF data stream to be returned to the CF function on the work station.

8. The CF function on the host returns the CDF data stream to its counterpart CF function on the work station. If character set translation is required, it is performed by the CF afer the data is transmitted back to the PWS. The CF function on the work station returns the CDF data to the application 37.

9. The application uses the Parser function 38 to obtain results of the host function call from the CDF data stream, displaying the results to the user where necessary via dialogs, pop-up windows, etc.

Function calls can include E/R data or lilt data as input or out parameters. The process of handling E/R data coming from the PWS is also similar, but in this case the routing will invoke the Load means which places the E/R data into the repository. Requesting the Unload function results in outputting E/R data that is encoded and sent back to the PWS.

Figure 3:
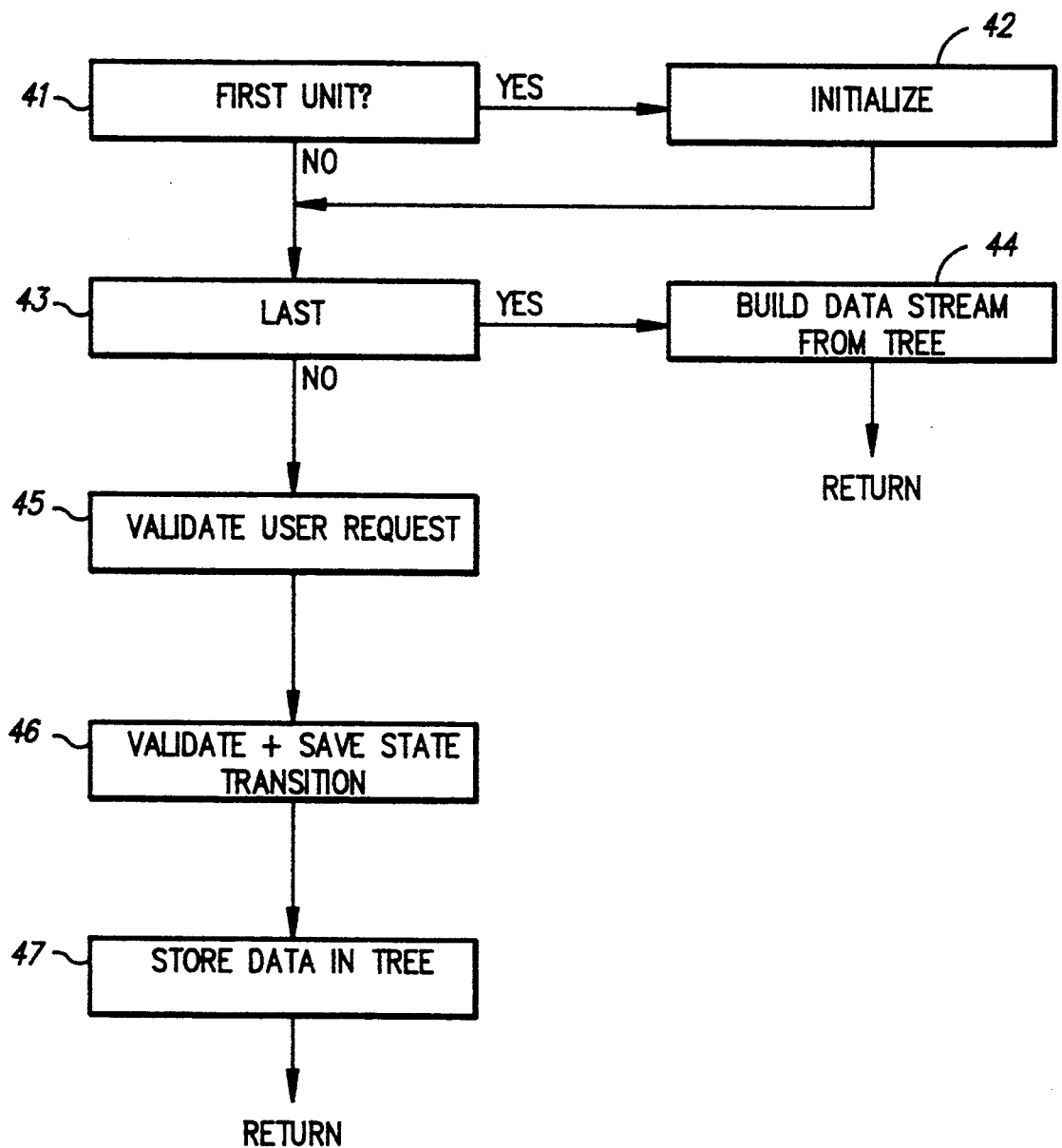
FIG. 3 shows an overview of the build process of the invention.

In FIG. 3 an overview of the build process is shown. When the first unit is processed 41 the initialization of memory, etc. is performed 42. If the last unit has been processed 43, then the data stream is constructed from the unit data which has been previously stored in tree form in memory 44. Since the requests from the application program must be a correct sequence, the sequence must be validated 45. The builder and parser are both driven using finite state automata techniques. The state table will be described in detail in Table 1 later. Since only certain state transitions are valid, these are also checked 46. The data for the unit is then stored in a tree in memory for later use in building the final data stream 47.

The parsing process is the reverse of the build process. The application program passes the parser a pointer to a data stream in memory or gives a file name which contains the data stream. The parser returns one unit at a time back to the application program. The parser keeps its own internal pointer into the data stream. The state table of Table 1 describes the details of the state transitions.

Figure 4:
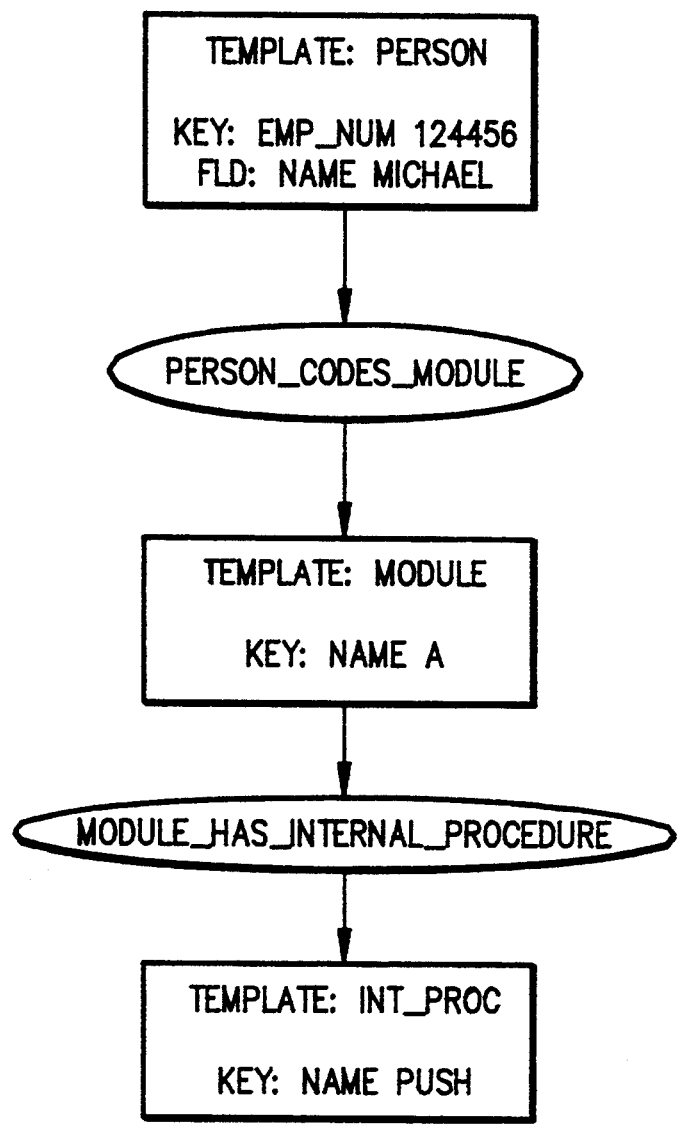
FIG. 4 shows a representation of a Template Tree Instance used as an example.

FIG. 4 shows a representation of a Template Tree Instance which will be used as an example. The data stream built From this Instance is 222 bytes long. The hexadecimal representation of this data stream is as follows:

| | | | | | | | |
|---|---|---|---|---|---|---|---|
| 000000DE | 00020000 | 002F0403 | D7C5D9E2 | D6D54040 | 0000000C | 0005F1F2 | F4F4F5F6 |
| 00000015 | 0406D5C1 | D4C54040 | 4040D4C9 | C3C8C1C5 | D3000000 | 150403D4 | D6C4E4D3 |
| C5404000 | 00000700 | 05C10000 | 003F0407 | F0F0F0F0 | F0F0F0F0 | F0F10000 | 001A0009 |
| D7C5D9E2 | D6D54040 | 0000000C | 0005F1F2 | F4F4F5F6 | 00000015 | 0009D4D6 | C4E4D3C5 |
| 40400000 | 00070005 | C1000000 | 180403C9 | D5E36DD7 | D9D6C300 | 00000A00 | 05D7E4E2 |
| C8000000 | 3D0407F0 | F0F0F0F0 | F0F0F0F0 | F2000000 | 150009D4 | D6C4E4D3 | C5404000 |
| 00000700 | 05C10000 | 00180009 | C9D5E36D | D7D9D6C3 | 0000000A | 0005D7E4 | E2C80000 |
| 00000000 | 00000000 | 00000000 | 00000000 | 00000000 | 00000000 | | |

In the following the hexadecimal/character representation of a CDF Data Stream is broken down unit. The prefix is the first 6 bytes. The length is the first 4 bytes of the prefix, the action is the next byte of the prefix, and the id is the last byte of the prefix. The rest of the line is the data (this is of varying length).

000000DE 0002
Length=222, action=0 (NONE), id=2 (E/R$_{1-3}$DATA_GROUP_ID), data=none.
0000002F 0403D7CSD9E2 D6D54040
Length=47, action=4 (READ), id=zz (TMPL_ID), data=PERSON
0000000C 0005FI F2 F4F4F5F6
Length=12, action=0 (NONE), id=5 (TMPL_KEY_ID), data=124456
00000015 0406D5C1 D4C54040 4040D4C9 C3C8C1C5 D3
Length=21, action=4 (READ), id=6 (FIELD_ID), data=NAME MICHAEL,
00000015 0403D4D6 C4E4D3C5 4040
Length=21, action=4 (READ), id=3 (TMPL_ID), data=MODULE
00000007 0005C1
Length=7, action=0 (NONE), id=5 (TMPL_KEY_ID), data=A 0000003F 0407F0F0 F0F0F0F0 F0F0F0F1
Length=63, action=4 (READ), id=7 (REL_ID), data=0000000001

0000001A 0009D7C5 D9E2D6D5 4040
Length=26, action=0 (NONE), id=9 (RELENT_KEY_ID), data=PERSON
0000000C 0005F1F2 F4F4F5F6
Length=12, action=0 (NONE), id=5 (TMPL_KEY_ID), data=124456
00000015 0009D4D6 C4E4D3C5 4040
Length=21, action=0 (NONE), id=9 (RELENT_KEY_ID), data=MODULE
00000007 0005C1
Length=7, action=0 (NONE), id=5 (TMPL_KEY_ID), data=A
00000018 0403C9D5 E36DD7D9 D6C3
Length=24, action=4 (READ), id=3 (TMPL_ID), data=INT_PROC
0000000A 0005D7E4 E2C8
Length=10, action=0 (NONE), id=5 (TMPL_KEY_ID), data=PUSH
0000003D 0407F0F0 F0F0F0F0 F0F0F0F2
Length=61, action=4 (READ), id=7 (REL_ID), data=0000000002
00000015 0009D4D6 C4E4D3C5 4040
Length=21, action=0 (NONE), id=9 (RELENT_KEY_ID), data=MODULE
00000007 0005C1
Length=7, action=0 (NONE), id=5 (TMPL_KEY_ID), data=A
00000018 0009C9D5 E36DD7D9 D6C3
Length=24, action=0 (NONE), id=9 (RELENT_KEY_ID), data=INT_PROC
0000000A 0005D7E4 E2C8
Length=10, action=0 (NONE), id=5 (TMPL_KEY_ID), data=PUSH The printable Parser output for this data stream is:

| E/R_DATA_GROUP_ID | NONE | |
|---|---|---|
| TMPL_ID | READ | PERSON |
| TMPL_KEY_ID | NONE | 124456 |
| FIELD_ID | READ | NAME MICHAEL |
| TMPL_ID | READ | MODULE |
| TMPL_KEY_ID | NONE | A |
| REL_ID | READ | 0000000001 |
| RELENT_KEY_ID | NONE | PERSON |
| TMPL_KEY_ID | NONE | 124456 |
| RELENT_KEY_ID | NONE | MODULE |
| TMPL_KEY_ID | NONE | A |
| TMPL_ID | READ | INT_PROC |
| TMPL_KEY_ID | NONE | PUSH |
| REL_ID | READ | 0000000002 |
| RELENT_KEY_ID | NONE | MODULE |
| TMPL_KEY_ID | NONE | A |
| RELENT_KEY_ID | NONE | INT_PROC |
| TMPL_KEY_ID | NONE | PUSH |

Common Data Format

The Common Data Format (CDF) provides a consistent means of communicating data among host and work station functions. It supports communication of E/R instance data and file data. In addition, it allows work station users to indirectly invoke host functions and receive results of host function processing. The CDF will be formally described.

CDF Basic Format

The CDF consists of units of data used to represent entity, attribute, and relationship instance data, function call information including parameters, and file data. Each CDF unit has a self-describing prefix area followed by a variable-length data area. The prefix area contains a 4-byte length field, a 1-byte action field, and a 1-byte unit identifier field. The data area may or may not contain data depending upon the type of unit being described.

The CDF data stream grammar is described below. Functions that deal with data in the CDF should not maintain or otherwise handle the CDF data stream directly; this information is maintained by the Builder and Parser functions. Note also that CDF data streams consist of binary and character data. The prefix area is represented in binary and the data area in character.

CDF Formal Grammar

This section contains a formal description of the CDF grammar. It shows the units that can make up a CDF data stream as well as the semantics that go along with those units. All CDF data streams must conform to this formal grammar in order to be processed by the Builder and Parser functions.

Standard Backus Naur Form (BNF) notation is used to document this description.

```
<cdf_data_stream>       ::= <edmm_data_stream> | <er_data_group> | <file_data_group>
<edmm_data_stream>      ::= length <no_action> edmm_data_stream_id <edmm_data_list>
<edmm_data_list>        ::= <edmm_data> <edmm_data_list> | <edmm_data>
<edmm_data>             ::= <function_call> | <function_call> <er_data_group> |
                            <function_call> <file_data_group>
<function_call>         ::= length <no_action> fun_call_id fun_name <fun_parm_list>
<fun_parm_list>         ::= <fun_parm> <fun_parm_list> | <NULL>
<fun_parm>              ::= length <no_action> fun_parm_id fun_parm_name
                            fun_parm_value
<er_data_group>         ::= length <no_action> er_data_group_id <er_data_list>
<er_data_list>          ::= <er_data> <er_data_list> | <er_data>
<er_data>               ::= <template> | <rel>
<template>              ::= length <crud_action< tmpl_id template_name
                            <tmpl_key_list> <field_list>
<tmpl_key_list>         ::= <tmpl_key> <tmpl_key_list> | <tmpl_key>
<tmpl_key>              ::= length <no_action> temp_tmpl_key_id <temp_key> |
                            length <no_action> tmpl_key_id key_value
<field_list>            ::= <field> <field_list> | <NULL>
<field>                 ::= length <crud_action> field_id field_name field_value
<rel>                   ::= length <crd_action> rel_id <rel_key> <source_key>
                            <target_key> |
                            length <cu_action> orel_id <rel_key> <rel_posn>
                            <source_key> <target_key>
<source_key>            ::= <relent_key> | <relrel_key>
<target_key>            ::= <relent_key> | <relrel_key>
<relent_key>            ::= length <no_action> relent_key_id template_name
                            <tmpl_key_list>
<relrel_key>            ::= length <no_action> relrel_key_id rel_key
<file_data_group>       ::= length <no_action> file_data_group_id <file_data_list>
<file_data_list>        ::= <line> <file_data_list> | <line>
<line>                  ::= length <no_action> line_id line_value
<crud_action>           ::= create | read | updata | delete
<cu_action>             ::= create | update
<crd_action>            ::= create | read | delete
<c_action>              ::= create
<no_action>             ::= none
<temp_key>              ::= unique_key
<rel_key>               ::= unique_key
<rel_posn>              ::= unique_key | 0
<NULL>                  ::=
Terminals
length                  ::= Binary(4) - Length of unit (including the prefix (
                            length(4), action(1), and unit id(1)) plus data)
none                    ::= Binary(1) 00
create                  ::= Binary(1) 01
delete                  ::= Binary(1) 02
update                  ::= Binary(1) 03
read                    ::= Binary(1) 04
edmm_data_stream_id     ::= Binary(1) 00
fun_call_id             ::= Binary(1) 01
e/r_data_group_id       ::= Binary(1) 02
tmpl_id                 ::= Binary(1) 03
temp_tmpl_key_id        ::= Binary(1) 04
tmpl_key_id             ::= Binary(1) 05
field_id                ::= Binary(1) 06
rel_id                  ::= Binary(1) 07
orel_id                 ::= Binary(1) 08
relent_key_id           ::= Binary(1) 09
relrel_key_id           ::= Binary(1) 10
fun_parm_id             ::= Binary(1) 11
file_data_group_id      ::= Binary(1) 13
line_id                 ::= Binary(1) 14
template_name           ::= Char(8) - Name of entity template
```

-continued

| | |
|---|---|
| unique_key | ::= Char(10) - A temporary unique identifier for an entity whose key has not yet been generated by the repository, or a relationship instance. Allowable characters are 0-9, the associated integer value must be greater than zero. |
| key_value | ::= Char(*) - Value of the key |
| field_name | ::= Char(8) - Name of a template field |
| field_value | ::= Char(*) - Value of the field |
| fun_name | ::= Char(8) - Name of the function being invoked |
| fun_parm_name | ::= Char(8) - Name of a function parameter |
| fun_parm_value | ::= Char(*) - Value of a function parameter |
| line_value | ::= Char(*) - Value of a line in a flat file |

BUILDER

The purpose of the Builder Function is to build the CDF data stream one unit at a time. The units are built as specified by the FUNCTION_ID passed in. This function ensures that the CDF data stream being built is valid; if the unit built is invalid, an appropriate return code is passed back to the caller.

The following is the interface to the builder:

```
int egppb100(
    unsigned short function_id,    IN: Function to perform
    short id,                       IN: Unit's id
    short action,                   IN: Unit's action
    UNITDATA *data,                 IN: Unit's name, key, value
    char *filename,                 IN: File Name
    char **memptr,                  INOUT: Ptr to block of memory
    B_HNDL *handle,                 INOUT: Ptr to private data area
    char *cc)                       OUT: Reason code
```

Note: Data types UNITDATA and B_HNDL are defined in the EGPBACDF H file. You must include this H file in your function that calls the BUILDER.

The purpose of this function is to build a CDF data stream one unit at a time. A unit is defined as an id, action, and data. A unit may be nested to contain other units. To build a nested structure, add the parent unit first, and then all of its dependents. The Builder has functions that work together to build a Common Data Format Data Stream, as well as functions that write the structure to memory or a file. The functions are as follows:

FIRST

Adds the first unit to the CDF Data Stream. This function is only issued once during the Building of a CDF data stream. The unit that accompanies the FIRST Build action only has an ID (i.e., there is no action and no associated data). Following is a list of the allowable units with which the FIRST function may be associated:

| | | |
|---|---|---|
| EDMM Data Stream | Adds an EDMM Data Stream unit to the Common Data Format Data Stream | |
| | id | EDMM_DATA_STREAM_ID |
| | action | NONE |
| | data | NULL (ignored) |
| | filename | NULL (ignored) |
| | memptr | NULL (ignored) |
| | handle | Handle to Builder's Control Block |
| ER Data Group | Adds an ER_Data Group unit to the Common Data Format Data Stream | |
| | id | ER_DATA_GROUP_ID |
| | action | NONE |
| | data | NULL (ignored) |
| | filename | NULL (ignored) |
| | memptr | NULL (ignored) |
| | handle | Handle to Builder's Control Block |
| File Data Group | Adds a File Data Group unit to the Common Data Format Data Stream | |
| | id | file_data_group |
| | action | NONE |
| | data | NULL (ignored) |
| | filename | NULL (ignored) |
| | memptr | NULL (ignored) |
| | handle | Handle to Builder's Control Block |

NEXT

Adds an additional unit. This unit contains an id, action, and data portion. If the Unit is a nesting unit, there may or may not be a data portion. Following is a list of the allowable units with which the Build's NEXT function may be associated:

| | | |
|---|---|---|
| Function Call | Adds a function call unit to the Common Data Format Data Stream | |
| | id | FUN_CALL_ID |
| | action | NONE |

-continued

|  |  |  |
|---|---|---|
|  | data |  |
|  |  | name = fun_name |
|  |  | value = NULL (ignored) |
|  |  | temp_key = NULL (ignored) |
|  |  | rel_posn = NULL (ignored) |
|  | filename | NULL (ignored) |
|  | memptr | NULL (ignored) |
|  | handle | Handle to Builder's Control Block |
| Function Parm | Adds a function parameter unit to the Common Data Format Data Stream |  |
|  | id | FUN_PARM_ID |
|  | action | NONE |
|  | data |  |
|  |  | name = fun_parm_name |
|  |  | value = fun_parm_value |
|  |  | temp_key = NULL (ignored) |
|  |  | rel_posn = NULL (ignored) |
|  | filename | NULL (ignored) |
|  | memptr | NULL (ignored) |
|  | handle | Handle to Builder's Control Block |
| ER Data Group | Adds an ER_Data_group unit to the Common Data Format Data Stream |  |
|  | id | ER_DATA_GROUP_ID |
|  | action | NONE |
|  | data | NULL (ignored) |
|  | filename | NULL (ignored) |
|  | memptr | NULL (ignored) |
|  | handle | Handle to Builder's Control Block |
| Template | Adds a template unit to the Common Data Format Data Stream |  |
|  | id | TMPL_ID |
|  | action |  |
|  |  | CREATE |
|  |  | READ |
|  |  | UPDATE |
|  |  | DELETE |
|  | data |  |
|  |  | name = template_name |
|  |  | value = NULL (ignored) |
|  |  | temp_key = NULL (ignored) |
|  |  | rel_posn = NULL (ignored) |
|  | filename | NULL (ignored) |
|  | memptr | NULL (ignored) |
|  | handle | Handle to Builder's Control Block |
| Template Key | Adds a template key unit to the Common Data Format Data Stream. There are two allowable variations. |  |
|  | id | TEMP_TMPL_KEY_ID |
|  | action | NONE |
|  | data |  |
|  |  | name = NULL (ignored) |
|  |  | value = NULL (ignored) |
|  |  | temp_key = temp_key |
|  |  | rel_posn = NULL (ignored) |
|  | filename | NULL (ignored) |
|  | memptr | NULL (ignored) |
|  | handle | Handle to Builder's Control Block |
|  | OR |  |
|  | id | TEMP_KEY_ID |
|  | action | NONE |
|  | data |  |
|  |  | name = NULL (ignored) |
|  |  | value = key_value |
|  |  | temp_key = NULL (ignored) |
|  |  | rel_posn = NULL (ignored) |
|  | filename | NULL (ignored) |
|  | memptr | NULL (ignored) |
|  | handle | Handle to Builder's Control Block |
| Field | Adds a field unit to the Common Data Format Data Stream |  |
|  | id | FIELD_ID |
|  | action |  |
|  |  | CREATE |
|  |  | READ |
|  |  | UPDATE |
|  |  | DELETE |
|  | data |  |
|  |  | name = field_name |
|  |  | value = field_value |
|  |  | temp_key = NULL (ignored) |
|  |  | rel_posn = NULL (ignored) |
|  | filename | NULL (ignored) |
|  | memptr | NULL (ignored) |
|  | handle | Handle to Builder's Control Block |

| | | |
|---|---|---|
| Rel | \multicolumn{2}{l}{Adds a relationship unit to the Common Data Format Data Stream. There are two allowable variations.} |
| | id | REL_ID |
| | action | |
| | | CREATE |
| | | READ |
| | | DELETE |
| | data | |
| | | name = NULL (ignored) |
| | | value = NULL (ignored) |
| | | temp_key = rel_key |
| | | rel_posn = NULL (ignored) |
| | filename | NULL (ignored) |
| | memptr | NULL (ignored) |
| | handle | Handle to Builder's Control Block |
| | OR | |
| | id | OREL_ID |
| | action | |
| | | CREATE |
| | | UPDATE |
| | data | |
| | | name = NULL (ignored) |
| | | value = NULL (ignored) |
| | | temp_key = rel_key |
| | | rel_posn = rel_posn |
| | filename | NULL (ignored) |
| | memptr | NULL (ignored) |
| | handle | Handle to Builder's Control Block |
| relent key | \multicolumn{2}{l}{Adds a relationship's source/target entity instance key to the Common Data Format Data Stream} |
| | id | RELENT_KEY_ID |
| | action | NONE |
| | data | |
| | | name = template_name |
| | | value = NULL (ignored) |
| | | temp_key = NULL (ignored) |
| | | rel_posn = NULL (ignored) |
| | filename | NULL (ignored) |
| | memptr | NULL (ignored) |
| | handle | Handle to Builder's Control Block |
| relrel key | \multicolumn{2}{l}{Adds a relationship's source/target relationship instance key to the Common Data Format Data Stream} |
| | id | RELREL_KEY_ID |
| | action | NONE |
| | data | |
| | | name = NULL (ignored) |
| | | value = NULL (ignored) |
| | | temp_key = rel_key |
| | | rel_posn = NULL (ignored) |
| | filename | NULL (ignored) |
| | memptr | NULL (ignored) |
| | handle | Handle to Builder's Control Block |
| file data group | \multicolumn{2}{l}{Adds a file data group unit to the Common Data Format Data Stream} |
| | id | FILE_DATA_GROUP_ID |
| | action | NONE |
| | data | NULL (ignored) |
| | filename | NULL (ignored) |
| | memptr | NULL (ignored) |
| | handle | Handle to Builder's Control Block |
| line | \multicolumn{2}{l}{Adds a line unit to the Common Data Format Data Stream.} |
| | id | LINE_ID |
| | action | NONE |
| | data | |
| | | name = NULL (ignored) |
| | | value = line_value |
| | | temp_key = NULL (ignored) |
| | | rel_posn = NULL (ignored) |
| | filename | NULL (ignored) |
| | memptr | NULL (ignored) |
| | handle | Handle to Builder's Control Block |

ADD_STREAM

Adds a complete, self-contained CDF data stream to the current data stream. The complete self contained data stream must have been built using the Builder. This unit contains the complete unit ill a block of memory. The block of memory has all the lengths, and nested units resolved. No semantic checking will be performed on the units contained within this unit block. However, semantic checks will be performed to see if this unit is inserted in the current CDF data stream in the proper context.

The ADD_STREAM action can be used with the following units. Note: Memptr and filename are mutually exclusive and required. One or the other must have a value, but not both.

| | |
|---|---|
| er data group | Adds a complete self-contained ER Data Group unit to the EDMM Data Stream. |
| | id          NO_ID (ignored) |
| | action      NONE |
| | data        NULL (ignored) |
| | filename   NULL or file name of er_data_group data stream to be inserted |
| | memptr    NULL or pointer to er_data_group data stream to be inserted |
| | handle     Handle to Builder's Control Block |
| file data group | Adds a complete self-contained File Data Group unit to the EDMM Data Stream. |
| | id          NO_ID (ignored) |
| | action      NONE |
| | action      NONE |
| | data        NULL (ignored) |
| | filename   NULL or file name of file_data_group data stream to be inserted |
| | memptr    NULL or pointer to file_data_group data stream to be inserted |
| | handle     Handle to Builder's Control Block |

ABNORMAL_END

Caller is requesting an abnormal end to the build process before the end of the data stream has been reached. The Builder function dumps any CDF data already created into a diagnostic file.

| | |
|---|---|
| id | NO_ID (ignored) |
| action | NONE (ignored) |
| data | NULL (ignored) |
| filename | NULL (ignored) |
| memptr | Ignored on input. Data Stream. |
| handle | Handle to Builder's Control Block |

WRITE_MEM

Writes the Common Data Format Data Stream to one contiguous block of memory and returns the address. Memory is allocated by the builder. This function can only be successfully executed once for each Common Data Format Data Stream. After this call has been made, there are no other valid calls to the Builder that reference the current CDF data stream.

| | |
|---|---|
| id | NO_ID (ignored) |
| action | NONE (ignored) |
| data | NULL (ignored) |
| filename | NULL (ignored) |
| memptr | Ignored on input. Data Stream. |
| handle | Handle to Builder's Control Block |

WRITE_FILE

Writes the Common Data Format Data Stream to a file. The Builder opens the file, writes the Common Data Format Data Stream to the file, and closes the file. The file's name is specified by the caller by the filename input parameter. This function can only be successfully executed once for each Common Data Format Data Stream. After this call has been made, there are no other valid calls to the Builder that reference the current CDF data stream.

| | |
|---|---|
| id | NO_ID (ignored) |
| action | NONE (ignored) |
| data | NULL (ignored) |
| filename | Name of the file to which the Builder writes the Common Data Format Data Stream. |
| memptr | NULL (ignored) |
| handle | Handle to Builder's Control Block |

Parser

The purpose of the Parser function is to retrieve data one unit at a time from a CDF data stream. The data stream is parsed as specified by the FUNCTION_ID passed in. During parsing, this function ensures that the CDF data stream is valid; if the unit parsed is invalid, an appropriate return code is passed back to the caller.

The invocation of the Parser function is as follows:

```
sc = egppp100 (function_id,
               cdf_file,
               &cdf_mem,
               &handle,
               &id,
               &action,
               &data,
               cc);
```

```
int egppp100(
    unsigned short function_id,   IN:    Function to perform
    char *filename,                IN:    Name of file with CDF data
    char **memptr,                 INOUT: Ptr to CDF data in memory
    P_HNDL *handle,                INOUT: Ptr to persistent data
    short *id,                     OUT:   Parsed unit's id
    short *action,                 OUT:   Parsed unit's action
    UNITDATA *data,                OUT:   Parsed unit's data
```

| | |
|---|---|
| char *cc) | OUT: Condition code |

The UNITDATA data type is defined in the EGP-BACDF Header file. The UNITDATA type further defines the kinds of data that can be returned for a CDF unit; depending upon the type of unit parsed, its data portion will be in certain fields of this structure as specified in the Header file. This Header file must be included in any function that interacts with the CDF data stream in any way.

The purpose of this function is to parse a CDF data stream one unit at a time. A CDF unit is defined as having a length, id, action, and sometimes data. All but the length of the unit is returned to the caller from the Parser function. A unit may be nested to contain other units. When parsing, the caller receives units in the order they occur in the CDF data stream. Thus, the "nesting" unit is parsed before its nested "children" units. The caller has the option to skip these parent nesting units should that unit type not make sense to them.

When the Parser function reaches the end of the data stream, or when an ABNORMAL_END function is specified, a warning code accompanied by an EOP condition code is returned to the caller.

The Parser function is intended to provide a complete package of functions that can be executed against the given CDF data stream. The functions and their descriptions are as follows:

FIRST

Parse the first CDF unit From the data stream. This function is only issued once during the parsing of a CDF data stream. The only units the caller can expect from a FIRST call appear below. These units are the "header" units in the data stream. Their actions are always NONE and they have no data. If any other unit appears first in the data stream, the Parser terminates with an "invalid data stream" condition code. Following is a list of the input and output data associated with a FIRST call:

| | | |
|---|---|---|
| Edmm Data Stream | The Common Data Format Data Stream being parsed may contain Function, E/R, and File data. | |
| | function_id | FIRST |
| | filename | Name of file containing CDF data stream |
| | memptr | Pointer to CDF data stream in memory |
| | handle | Pointer to Parser's persistent data control block |
| | id | EDMM_DATA_STREAM_ID |
| | action | NONE |
| | data | NULL (fields in structure are empty) |
| E/R Data Group | The Common Data Format Data Stream being parsed contains E/R data | |
| | function_id | FIRST |
| | filename | Name of file containing CDF data stream (opened by Parser) |
| | memptr | Pointer to CDF data stream in memory (updated as stream is parsed) |
| | handle | Pointer to Parser's persistent data control block |
| | id | ER_DATA_GROUP_ID |
| | action | NONE |
| | data | NULL (fields in structure are empty) |
| File Data Group | The Common Data Format Data Stream being parsed contains File data | |
| | function_id | FIRST |
| | filename | Name of file containing CDF data stream (opened by Parser) |
| | memptr | Pointer to CDF data stream in memory (updated as stream is parsed) |
| | handle | Pointer to Parser's persistent data control block |
| | id | FILE_DATA_GROUP_ID |
| | action | NONE |
| | data | NULL (fields in structure are empty) |

In addition to simply parsing units from the data stream, the Parser also verifies the semantic correctness of the data stream at each step through parsing. If at any point during the parsing process the unit is invalid with respect to the unit previously parsed, or the unit's action is invalid for the particular unit, the parsing process terminates with an appropriate condition code to alert the caller of an invalid data stream.

NEXT

Parse the next unit from the CDF data stream. This function presumes that a position has already been established in the stream via the FIRST function. If positioning has not already been established, the Parser returns with an error, but the user has the ability to then issue a FIRST to correct the problem. The unit returned contains an id, action, and data portion, if data exists for that unit. Following is a list of the input and output data associated with a Parser NEXT function:

| | | |
|---|---|---|
| Function Call | The CDF data stream contains a function call data | |
| | function_id | NEXT |
| | filename | Name of file containing CDF data stream |

|  |  |  |
|---|---|---|
|  | memptr | Pointer to CDF data in memory (updated from previous parse) |
|  | handle | Pointer to Parser's persistent data control block |
|  | id | FUN_CALL_ID |
|  | action | NONE |
|  | data | name = fun_name<br>value = NULL (empty)<br>temp_key = NULL (empty)<br>rel_posn = NULL (empty) |
| Function Parameter | Function Call data in data stream contains function parameter data | |
|  | function_id NEXT | |
|  | filename | Name of file containing CDF data stream |
|  | memptr | Pointer to CDF data in memory (updated from previous parse) |
|  | handle | Pointer to Parser's persistent data control block |
|  | id | FUN_PARM_ID |
|  | action | NONE |
|  | data | name = fun_parm_name<br>value = fun_parm_value<br>temp_key = NULL (ignored)<br>rel_posn = NULL (ignored) |
| ER Data Group | The CDF data stream contains E/R data | |
|  | function_id NEXT | |
|  | filename | Name of file containing CDF data stream |
|  | memptr | Pointer to CDF data in memory (updated from previous parse) |
|  | handle | Pointer to Parser's persistent data control block |
|  | id | ER_DATA_GROUP_ID |
|  | action | NONE |
|  | data | NULL (empty) |
| Template | E/R data in data stream contains template instance | |
|  | function_id NEXT | |
|  | filename | Name of file containing CDF data stream |
|  | memptr | Pointer to CDF data in memory (updated from previous parse) |
|  | handle | Pointer to Parser's persistent data control block |
|  | id | TEMPL_ID |
|  | action | CREATE<br>READ<br>UPDATE<br>DELETE |
|  | data | name = template_name<br>value = NULL (empty)<br>temp_key = NULL (empty)<br>rel_posn = NULL (empty) |
| Template Key | Template instance in data stream contains template key (temporary or real) | |
|  | function_id NEXT | |
|  | filename | Name of file containing CDF data stream |
|  | memptr | Pointer to CDF data in memory (updated from previous parse) |
|  | handle | Pointer to Parser's persistent data control block |
|  | id | TEMP_TMPL_KEY_ID |
|  | action | NONE |
|  | data | name = NULL (empty)<br>value = NULL (empty)<br>temp_key = temp_key<br>rel_posn = NULL (empty) |
|  | OR | |
|  | function_id NEXT | |
|  | filename | Name of file containing CDF data stream |
|  | memptr | Pointer to CDF data in memory (updated from previous parse) |
|  | handle | Pointer to Parser's persistent data control block |
|  | id | TMPL_KEY_ID |
|  | action | NONE |
|  | data | name = NULL (empty)<br>value = key_value<br>temp_key = NULL (empty) |

-continued

| | | |
|---|---|---|
| | | rel_posn = NULL (empty) |
| Field | Template instance in data stream contains field | |
| | function_id NEXT | |
| | filename | Name of file containing CDF data stream |
| | memptr | Pointer to CDF data in memory (updated from previous parse) |
| | handle | Pointer to Parser's persistent data control block |
| | id | FIELD_ID |
| | action | |
| | | CREATE |
| | | READ |
| | | UPDATE |
| | | DELETE |
| | data | |
| | | name = field_name |
| | | value = field_value |
| | | temp_key = NULL (empty) |
| | | rel_posn = NULL (empty) |
| Rel | E/R data in data stream contains relationship instance (two allowable variations) | |
| | function_id NEXT | |
| | filename | Name of file containing CDF data stream |
| | memptr | Pointer to CDF data in memory (updated from previous parse) |
| | handle | Pointer to Parser's persistent data control block |
| | id | REL_ID |
| | action | |
| | | CREATE |
| | | READ |
| | | DELETE |
| | data | |
| | | name = NULL (empty) |
| | | value = NULL (empty) |
| | | temp_key = rel_key |
| | | rel_posn = NULL (empty) |
| | OR | |
| | function_id NEXT | |
| | filename | Name of file containing CDF data stream |
| | memptr | Pointer to CDF data in memory (updated from previous parse) |
| | handle | Pointer to Parser's persistent data control block |
| | id | OREL_ID |
| | action | |
| | | CREATE |
| | | UPDATE |
| | data | |
| | | name = NULL (empty) |
| | | value = NULL (empty) |
| | | temp_key = rel_key |
| | | rel_posn = rel_posn |
| relent key | Relationship in data stream has source/target that is entity instance | |
| | function_id NEXT | |
| | filename | Name of file containing CDF data stream |
| | memptr | Pointer to CDF data in memory (updated from previous parse) |
| | handle | Pointer to Parser's persistent data control block |
| | id | RELENT_KEY_ID |
| | action | NONE |
| | data | |
| | | name = template_name |
| | | value = NULL (empty) |
| | | temp_key = NULL (empty) |
| | | rel_posn = NULL (empty) |
| relrel key | Relationship in data stream has source/target that is relationship instance | |
| | function_id NEXT | |
| | filename | Name of file containing CDF data stream |
| | memptr | Pointer to CDF data in memory (updated from previous parse) |
| | handle | Pointer to Parser's persistent data control block |
| | id | RELREL_KEY_ID |
| | action | NONE |
| | data | |
| | | name = NULL (empty) |
| | | value = NULL (empty) |
| | | temp_key = rel_key |

| | | |
|---|---|---|
| | | rel_posn = NULL (empty) |
| file data group | The CDF data stream contains file data | |
| | function_id NEXT | |
| | filename | Name of file containing CDF data stream |
| | memptr | Pointer to CDF data in memory (updated from previous parse) |
| | handle | Pointer to Parser's persistent data control block |
| | id | FILE_DATA_GROUP_ID |
| | action | NONE |
| | data | NULL (empty) |
| line | File data in data stream contains line data | |
| | function_id NEXT | |
| | filename | Name of file containing CDF data stream |
| | memptr | Pointer to CDF data in memory (updated from previous parse) |
| | handle | Pointer to Parser's persistent data control block |
| | id | LINE_ID |
| | action | NONE |
| | data | |
| | | name = NULL (empty) |
| | | value = line_value |
| | | temp_key = NULL (empty) |
| | | rel_posn = NULL (empty) |

PREVIOUS

Return unit data for previous unit parsed from CDF data stream. This function presumes that a position has already been established in the stream via a FIRST function. If positioning has not already been established, the Parser returns with an error, but the user has the ability to then issue a FIRST to correct the problem. The unit returned is the unit that has JUST been parsed; that is, the caller can only go back ONE unit. The unit returned contains an id, action, and data portion, if data exists for that unit. Any unit may be returned as a result of the Parser PREVIOUS function. Refer to the lists of units for FIRST or NEXT for the complete list.

SKIP

Skips the unit previously parsed from the CDF data stream. Again, this function presumes that a position has already been established in the stream via a FIRST function. This function does not return any unit data. Rather, it simply skills the unit that has JUST been parsed; successive SKIP calls to the Parser do NOT result in several units being skipped, but only succeed in skipping the same unit over and over. A SKIP call can be used to skip an entire nested unit of CDF data or a single unit of data (although skipping a single unit is an effective no-op).

GET_STREAM

Copy the PREVIOUS unit parsed (including all of its imbedded units) into a separate file or memory location as specified by the caller. This call is issued when the caller has parsed an ER13DATA_GROUP or FILE_DATA_GROUP unit and wants the entire E/R Data Group of File Data Group data stream imbedded within the CDF stream being parsed to be placed in a separate location for later access. The original data stream is not changed; the E/R or File data being copied is SKIPped in the original data stream so that parsing resumes at the unit following that imbedded stream.

The GET_STREAM Function cannot be issued on any units other than ER_DATA_GROUP and FILE_DATA_GROUP and these units must have first been parsed by the caller. An attempt to issue (GET_STREAM on any other unit results in an error and the Parser will terminate.

Possible values sent to and returned from the Parser for GET_STREAM are:

| | | |
|---|---|---|
| E/R Data Group | The E/R Data Group, complete with imbedded template and relationship data, is copied from the CDF data stream being parsed. | |
| | (IN) function_id GET_STREAM | |
| | (IN) filename Name of file which is to contain copied E/R Data Group data stream (NULL if data is to be copied to memory) | |
| | (IN/OUT) memptr Ignored upon input. Upon output and if filename is not specified, location in memory of E/R Data Group copied | |
| | handle | Pointer to Parser's persistent data control block |
| | id | ER_DATA_GROUP_ID |
| | action | NONE |
| | data | NULL (fields in structure are empty) |
| | | A subsequent NEXT on the original data stream yields the unit immediately following the entire E/R Data Group. |
| File Data Group | The File Data Group, complete with imbedded lines, is copied from the CDF data stream being parsed. | |
| | (IN) function_id GET_STREAM | |
| | (IN) filename Name of file which is to contain copied File Data Group data stream (NULL if data is to be copied to memory) | |
| | (IN/OUT) memptr Ignored upon input. Upon output | |

| | -continued |
|---|---|
| handle | and if filename is not specified, location in memory of File Data Group copied<br>Pointer to Parser's persistent data control block |
| id | FILE_DATA_GROUP_ID |
| action | NONE |
| data | NULL (fields in structure are empty)<br>A subsequent NEXT on the original data stream yields the unit immediately following the entire E/R Data Group. |

ABNORMAL_END

Alerts Parser function that caller has experienced problem and that parsing is to be terminated on the CDF data stream currently being parsed. When this function is specified, the Parser does the necessary work to clean up all temporary and persistent data used during parsing. This enables the parsing process to begin cleanly for the same calling function on a new data stream. (Note: the processing done for this function is exactly the same as when the Parser reaches the end of the CDF data stream.)

Free CDF Function

The purpose of the Free CDF function is to discard CDF data stream memory.

Free CDF interface:

| (In) CDF_MEM | | char* |
|---|---|---|
| Parameters | Descriptions | |
| CDF_MEM | Pointer to CDF data in memory. | |

The invocation of the Free CDF function is as follows:
```
char *cdf_mem;
short sc;
...
egppafre (cdf_mem);
```

Note: The equivalent function, egphafre c, exists on the host for users of EDMM.

EDMM Communication Facility

The purpose of the EDMM Communication Facility is to enable a work station application to invoke a fully-integrated Repository Manager/MVS function on the host communicating all file and E/R data between the work station and host functions. The communication is achieved by an open/close Repository, Manager/MVS function that opens the Repository Manager, transfers the function interface, file, and E/R data to the host in a CDF data stream, invokes the host fully-integrated RM host function specified in the data stream, returns the function interface and all data associated with the function call in a CDF data stream to the work station, and closes the Repository Manager/MVS. If no errors are encountered, output parameters and data, if any, for the host function, are returned to the caller in a CDF data stream.

| | | Interface |
|---|---|---|
| EDMM Communication Facility Interface | | |
| (In) CDF_FILE | | char 47 |
| (In/Out) CDF_MEM | | char* |
| (Out) SC | | short |
| (Out) CC | | char 9 |
| Parameters | Descriptions | |
| CDF_FILE | Name of work station file containing CDF data stream. (Opened and closed in this function.) CDF_FILE and CDF_MEM are mutually exclusive. See the description of CDF_MEM for more information about the CDF data stream content.<br>When the EDMM Communication Facility returns control to the caller, the output CDF data stream will usually be in memory (i.e., pointed to by CDF_MEM). However, if sufficient memory is not available, the CDF data stream will be written to a file, and CDF_MEM will return a NULL value. As currently implemented, the output CDF file is allocated within this function and the name is hard-coded as EGPPTCDF.OUT. | |
| CDF_MEM | Work station address of CDF data stream in memory. CDF_FILE and CDF_MEM are mutually exclusive: The caller of this function will use the Builder to create a CDF data stream that contains information on the function to be invoked on the host and its parameters, possibly including an imbedded CDF data stream containing file or E/R data units.<br>As an ouput parameter, CDF_MEM points to a CDF data stream that contains output parameters returned by the host function that was invoked on behalf of the caller. Again, depending on the host function interface, the CDF data stream may also include an imbedded CDF data stream containing file or E/R data units.<br>The caller will use the Parser to retrieve this information from the CDF data stream. | |
| SC | Return code representing processing results | |
| CC | Condition code representing processing results | |

The invocation of the EDMM Communication Facility is as follows: #include prototype function calls for EDMM, Builder and Parser

```
sc = egppt00 (cdf_file,
              &cdf_mem,
              cc);
```

Return codes are passed back in the CC and SC fields.

Productivity Facility

The Productivity Facility (PF) is the component that enables the rapid creation of data manipulation facilities based on a variety of views of E/R data in the repository and customizes the Communication Facility function.

The PF creates Repository Manager C-language functions described below.

Load__BB: A function that interprets a CDF data stream containing entity, attribute, and relationship information. It updates the repository as specified by the action 1field of each CDF unit.

Unload__BB: A function that retrieves a group of connected entities and relationships from the repository and translates the entity, attribute, and relationship information via the Builder function into a CDF data stream.

Copy__BB; A function that copies a group of connected entity and relationship instances in the repository.

Delete__BB: A function that deletes a group of connected entity and relationship instances from the repository.

Communication Facility: The host portion of (:F that enables the function routing to your RM functions.

Load BB

The Load__BB function adds or updates a logical unit of data in the repository as specified by the CDF data stream. Data is passed in as template and relationship units in an ER data group.

Separate functions must be defined for each data view needed by the application (i.e. each different template tree).

Note: Currently this function does not obtain any locks or perform any commits. In situations where the data must be locked before update, a lock must be separately obtained on the necessary entity instance prior to invoking the load function. A Commit should be performed after invoking this function in order to make changes to the repository permanent.

Interface

| Load__BB Interface | | |
|---|---|---|
| (In) CDF__MEM | | Fixed 32 |
| (In) CDF__FILE | | Char 46 |
| (Out) SC | | Fixed 16 |
| (Out) CC | | Char 8 |
| Parameters | Descriptions | |
| CDF__MEM | Host memory location of CDF data stream containing E/R data to be added, deleted, or updated in the repository. Caller will use the Builder function to put data to be loaded in a CDF data stream. Note: CDF__MEM and CDF__FILE are mutually exclusive. | |
| CDF__FILE | Host file containing CDF data stream | |
| SC | Severity code reflecting processing results | |
| CC | Condition code reflecting processing results | |

Return codes are passed back in the CS and CC fields of the data stream. Since the Load__BB functions are generated, each Load__BB has the same set of possible return codes.

Unload__BB

The Unload__BB function retrieves a logical unit of data from the repository and puts it in CDF data stream. Data is returned as template and relationship units in an ER data group.

Separate functions must be defined for each data view needed by the application (i.e. each different template tree).

Note: Currently this function does not obtain any locks. To avoid a "dirty read" a lock must be obtained on the aggregation instance.

Interface

| Unload__BB Interface | | |
|---|---|---|
| (In) SYSKEY | | Fixed 31 |
| (Out) CDF__MEM | | Fixed 32 |
| (Out) CDF__FILE | | Char 46 |
| (Out) SC | | Fixed 16 |
| (Out) CC | | Char 8 |
| Parameters | Descriptions | |
| SYSKEY | System-assigned key of the aggregation instance to be unloaded. | |
| CDF__MEM | Host memory location of CDF data stream containing the E/R data retrieved from the repository. Caller will use the Parser function to extract the data from the CDF data stream. Note: CDF__MEM and CDF__FILE are mutually exclusive. | |
| CDF__FILE | Host file name of CDF data stream containing the E/R data retrieved from the repository. Caller will use the Parser function to extract the data from the CDF data stream. | |
| SC | Severity code reflecting processing results | |
| CC | Condition code reflecting processing results | |

Host Function Invocation

Return codes are passed back in the CS and CC fields of the data stream. Since the Unload__BB Functions are generated, each Unload__BB has the same set of possible return codes.

Copy_BB

The purpose of the Copy_BB function is to allow the user to copy an entire object in the repository, storing the duplicate under another name. Any data view (i.e. a template tree) can can be copied using this function. The target of the Copy_BB must not already exist. The Copy_BB functions do not copy shareable subcomponents, but will create relationships to the shared subcomponents.

Note: As used herein all objects and shareable subcomponents have a root template with the following attributes: name, qualifier, and level. This function and its interface will have to be modified the data view does not conform to this naming standard.

Note: Currently this function does not obtain any locks or perform any commits. To avoid a "dirty read" a lock must be obtained on the source aggregation instance. A Commit should be performed after invoking this function in order to make changes to the repository permanent. obtained to avoid a "dirty read".

Delete BB

The purpose of the Delete_BB function is to enable the user to delete an object instance from the repository. This function can delete any data view (i.e. template tree). The Delete_BB functions defined here do not delete shareable subcomponents, but will delete the relationships to the shared subcomponents. The Load function can be used to delete individual entity instances within an aggregation instance.

Note: Currently this function does not obtain any locks or perform any commits. A DELETE lock must be obtained on the aggregation instance before invoking the function. A Commit should be performed after invoking this function in order to make the delete permanent.

| Interface | | |
|---|---|---|
| Delete_BB Interface | | |
| (In) SYSKEY | | Fixed 31 |
| (Out) SC | | Fixed 16 |
| (Out) CC | | Char 8 |
| Parameters | Descriptions | |
| SYSKEY | System-assigned key of the aggregation instance to be deleted. | |
| SC | Severity code reflecting processing results | |
| CC | Condition code reflecting processing results | |

Return codes are passed back in the SC and CC fields of the data stream. Since the Delete_BB functions are generated, each Delete_BB has the same set of possible return codes.

| Interface | | |
|---|---|---|
| Copy_BB Interface | | |
| (In) SYSKEY | | Fixed 31 |
| (In) TRG_NAME | | Char 32 |
| (In) TRG_QLFR | | Char 8 |
| (In) TRG_LVL | | Char 2 |
| (Out) SC | | Fixed 16 |
| (Out) CC | | Char 8 |
| Parameters | Descriptions | |
| SYSKEY | System-assigned key of the aggregation instance to be copied. | |
| TRG_NAME | Name of target aggregation instance | |
| TRG_QLFR | Qualifier of target aggregation instance | |
| TRG_LVL | Level of target aggregation instance | |
| SC | Severity code reflecting processing results | |
| CC | Condition code reflecting processing results | |

Return codes are passed back in the SC and CC fields of the data stream. Since the Copy_BB functions are generated, each Copy_BB has the same set of possible return codes.

Builder-Parser State Tables

Documented below is a state table that describes the valid units and actions when parsing or building a CDF data stream.

TABLE 1

| EDMM Builder/Parser State Table | | | |
|---|---|---|---|
| State | CDF Unit/Builder/Parser Action | Next State | Description |
| 0 | EDMM_DATA_STREAM/FIRST | 1 | Initial Start State. |
|  | ER_DATA_GROUP/FIRST | 24 |  |
|  | FILE_DATA_GROUP/FIRST | 31 |  |
| 1 | FUN_CALL/NEXT | 2 | Processing an |
|  | EDMM_DATA_STREAM/SKIP | 0 | edmm_data_stream. |
| 2 | FUN_CALL/NEXT | 2 | Processing a function call. |
|  | FUN_PARM/NEXT | 2 |  |
|  | ER_DATA_GROUP/NEXT | 3 |  |
|  | ER_DATA_GROUP/ADD_STREAM | 25 |  |
|  | FUN_CALL/SKIP | 26 |  |
|  | FILE_DATA_GROUP/NEXT | 33 |  |
|  | FILE_DATA_GROUP/ADD_STREAM | 35 |  |
|  | FINAL_STATE_ID/FINAL_STATE | 0 |  |

TABLE 1-continued
EDMM Builder/Parser State Table

| State | CDF Unit/Builder/Parser Action | Next State | Description |
|---|---|---|---|
| 3 | TMPL/NEXT | 4 | Processing an er_data_group |
|   | REL/NEXT | 7 | that is paired with a |
|   | OREL/NEXT | 36 | function_call. (Root is an |
|   | ER_DATA_GROUP/SKIP | 2 | edmm_data_stream) |
|   | ER_DATA_GROUP/GET_STREAM | 2 | |
| 4 | TEMP_TMPL_KEY/NEXT | 5 | Processing a template. |
|   | TMPL_KEY/NEXT | 5 | (Root is an |
|   | TMPL/SKIP | 27 | edmm_data_stream) |
| 5 | FUN_CALL/NEXT | 2 | Processing the a template |
|   | TMPL/NEXT | 4 | key list of a template. (Root |
|   | TEMP_TMPL_KEY/NEXT | 5 | is an edmm_data_stream) |
|   | TMPL_KEY/NEXT | 5 | |
|   | FIELD/NEXT | 6 | |
|   | REL/NEXT | 7 | |
|   | OREL/NEXT | 36 | |
|   | FINAL_STATE_ID/FINAL_STATE | 0 | |
| 6 | FUN_CALL/NEXT | 2 | Processing a field list of a |
|   | TMPL/NEXT | 4 | template. (Root is an |
|   | FIELD/NEXT | 6 | edmm_data_stream) |
|   | REL/NEXT | 7 | |
|   | OREL/NEXT | 36 | |
|   | FINAL_STATE_ID/FINAL_STATE | 0 | |
| 7 | RELREL_KEY/NEXT | 8 | Processing a rel. (Root is an |
|   | RELENT_KEY/NEXT | 9 | edmm_data_stream) |
|   | REL/SKIP | 27 | |
| 8 | RELREL_KEY/NEXT | 11 | Processing a relrel_key |
|   | RELENT_KEY/NEXT | 12 | which is the source key of a |
|   |   |   | rel. (Root is an |
|   |   |   | edmm_data_stream) |
| 9 | TEMP_TMPL_KEY/NEXT | 10 | Processing a relent_key |
|   | TMPL_KEY/NEXT | 10 | which is the source key of a |
|   | RELENT_KEY/SKIP | 28 | rel. (Root is an |
|   |   |   | edmm_data_stream) |
| 10 | TEMP_TMPL_KEY/NEXT | 10 | Processing the template key |
|   | TMPL_KEY/NEXT | 10 | list of a relent_key. The |
|   | RELREL_KEY/NEXT | 11 | relent_key is the source key |
|   | RELENT_KEY/NEXT | 12 | of a rel. (Root is an |
|   |   |   | edmm_data_stream) |
| 11 | FUN_CALL/NEXT | 2 | Processing a relrel_key |
|   | TMPL/NEXT | 4 | which is the target key of a |
|   | REL/NEXT | 7 | rel. (Root is an |
|   | OREL/NEXT | 36 | edmm_data_stream) |
|   | FINAL_STATE_ID/FINAL_STATE | 0 | |
| 12 | TEMP_TMPL_KEY/NEXT | 13 | Processing a relent_key |
|   | TMPL_KEY/NEXT | 13 | which is the target key of a |
|   | RELENT_KEY/SKIP | 27 | rel. (Root is an |
|   |   |   | edmm_data_stream) |
| 13 | FUN_CALL/NEXT | 2 | Processing the template key |
|   | TMPL/NEXT | 4 | list of relent_key. The |
|   | REL/NEXT | 7 | relent_key is the target key |
|   | OREL/NEXT | 36 | of a rel. (Root is an |
|   | TEMP_TMPL_KEY/NEXT | 13 | edmm_data_stream) |
|   | TMPL_KEY/NEXT | 13 | |
|   | FINAL_STATE_ID/FINAL_STATE | 0 | |
| 14 | TEMP_TMPL_KEY/NEXT | 15 | Processing a template. |
|   | TMPL_KEY/NEXT | 15 | (Root is an er_data_group) |
|   | TMPL/SKIP | 29 | |
| 15 | TMPL/NEXT | 14 | Processing the a template |
|   | TEMP_TMPL_KEY/NEXT | 15 | key list of a template. (Root |
|   | TMPL_KEY/NEXT | 15 | is an er_data_group) |
|   | FIELD/NEXT | 16 | |
|   | REL/NEXT | 17 | |
|   | OREL/NEXT | 37 | |
|   | FINAL_STATE_ID/FINAL_STATE | 0 | |
| 16 | TMPL/NEXT | 14 | Processing a field list of a |
|   | FIELD/NEXT | 16 | template. (Root is an |
|   | REL/NEXT | 17 | er_data_group) |
|   | OREL/NEXT | 37 | |
|   | FINAL_STATE_ID/FINAL_STATE | 0 | |
| 17 | RELREL_KEY/NEXT | 18 | Processing a rel. (Root is an |
|   | RELENT_KEY/NEXT | 19 | er_data_group) |
|   | REL/SKIP | 29 | |
| 18 | RELREL_KEY/NEXT | 21 | Processing a relrel_key |
|   | RELENT_KEY/NEXT | 22 | which is the source key of a |
|   |   |   | rel. (Root is an |
|   |   |   | er_data_group) |
| 19 | TEMP_TMPL_KEY/NEXT | 20 | Processing a relent_key |
|   | TMPL_KEY/NEXT | 20 | which is the source key of a |
|   | RELENT_KEY/SKIP | 30 | rel. (Root is an |

TABLE 1-continued

EDMM Builder/Parser State Table

| State | CDF Unit/Builder/Parser Action | Next State | Description |
|---|---|---|---|
| 20 | TEMP_TMPL_KEY/NEXT | 20 | Processing the template key |
|  | TMPL_KEY/NEXT | 20 | list of a relent_key. The |
|  | RELREL_KEY/NEXT | 21 | relent_key is the source key |
|  | RELENT_KEY/NEXT | 22 | of a rel. (Root is an er_data_group) |
| 21 | TMPL/NEXT | 14 | Processing a relrel_key |
|  | REL/NEXT | 17 | which is the target key of a |
|  | OREL/NEXT | 37 | rel. (Root is an |
|  | FINAL_STATE_ID/FINAL_STATE | 0 | er_data_group) |
| 22 | TEMP_TMPL_KEY/NEXT | 23 | Processing a relent_key |
|  | TMPL_KEY/NEXT | 23 | which is the target key of a |
|  | RELENT_KEY/SKIP | 29 | rel. (Root is an er_data_group) |
| 23 | TMPL/NEXT | 14 | Processing the template key |
|  | REL/NEXT | 17 | list of relent_key. The |
|  | OREL/NEXT | 37 | relent_key is the target key |
|  | TEMP_TMPL_KEY/NEXT | 23 | of a rel. (Root is an |
|  | TMPL_KEY/NEXT | 23 | er_data_group) |
|  | FINAL_STATE_ID/FINAL_STATE | 0 |  |
| 24 | TMPL/NEXT | 14 | Processing an er_data_group |
|  | REL/NEXT | 17 | that is root unit. |
|  | OREL/NEXT | 37 |  |
|  | ER_DATA_GROUP/SKIP | 0 |  |
|  | ER_DATA_GROUP/GET_STREAM | 0 |  |
| 25 | FUN_CALL/NEXT | 2 | Processing an er_data_group |
|  | FINAL_STATE_ID/FINAL_STATE | 0 | that is a complete stream. It is paired with a function_call. (Root is an edmm_data_stream) |
| 26 | ER_DATA_GROUP/NEXT | 3 | Processing a SKIP to the |
|  | FUN_CALL/NEXT | 2 | end of a function call. |
|  | FINAL_STATE_ID/FINAL_STATE | 0 | (Root is an edmm_data_stream) |
| 27 | FUN_CALL/NEXT | 2 | Processing a SKIP to the |
|  | TMPL/NEXT | 4 | end of a template, or |
|  | REL/NEXT | 7 | relation unit. (Root is an |
|  | OREL/NEXT | 36 | edmm_data_stream) |
|  | FINAL_STATE_ID/FINAL_STATE | 0 |  |
| 28 | RELREL_KEY/NEXT | 11 | Processing a SKIP to the |
|  | RELENT_KEY/NEXT | 12 | end of a relent source key of a rel. (Root is an edmm_data_stream) |
| 29 | TMPL/NEXT | 14 | Processing a SKIP to the |
|  | REL/NEXT | 17 | end of a template, or |
|  | OREL/NEXT | 37 | relation unit. (Root is an |
|  | FINAL_STATE_ID/FINAL_STATE | 0 | er_data_group) |
| 30 | RELREL_KEY/NEXT | 21 | Processing a SKIP to the |
|  | RELENT_KEY/NEXT | 22 | end of a relent source key of a rel. (Root is an er_data_group) |
| 31 | FILE_DATA_GROUP/SKIP | 0 | Processing a file_data_group |
|  | FILE_DATA_GROUP/GET_STREAM | 0 | which is root unit. |
|  | LINE/NEXT | 32 |  |
| 32 | LINE/NEXT | 32 | Processing a line of a |
|  | FINAL_STATE_ID/FINAL_STATE | 0 | file_data_group. (Root is a file_data_group.) |
| 33 | FILE_DATA_GROUP/SKIP | 2 | Processing a |
|  | FILE_DATA_GROUP/GET_STREAM | 2 | file_data_group. It is paired |
|  | LINE/NEXT | 34 | with a function call. (Root is an edmm_data_stream) |
| 34 | FUN_CALL/NEXT | 2 | Processing a line of a |
|  | LINE/NEXT | 34 | file_data_group. (Root is an |
|  | FINAL_STATE_ID/FINAL_STATE | 0 | edmm_data_stream) |
| 35 | FUN_CALL/NEXT | 2 | Processing a file_data_group |
|  | FINAL_STATE_ID/FINAL_STATE | 0 | which is a complete stream. It is paired with a function_call. (Root is an edmm_data_stream) |
| 36 | RELREL/NEXT | 38 | Processing an orel. (Root is |
|  | RELENT/NEXT | 39 | an edmm_data_stream) |
|  | OREL/SKIP | 27 |  |
| 37 | RELREL/NEXT | 43 | Processing an orel. (Root is |
|  | RELENT/NEXT | 44 | an er_data_group) |
|  | OREL/SKIP | 29 |  |
| 38 | RELENT_KEY/NEXT | 41 | Processing a relrel_key which is the source key of an orel. (Root is an edmm_data_stream) |

TABLE 1-continued

EDMM Builder/Parser State Table

| State | CDF Unit/Builder/Parser Action | Next State | Description |
|---|---|---|---|
| 39 | TEMP_TMPL_KEY/NEXT | 40 | Processing a relent_key |
|  | TMPL_KEY/NEXT | 40 | which is the source key of |
|  | RELENT_KEY/SKIP | 49 | an orel. (Root is an edmm_data_stream) |
| 40 | TEMP_TMPL_KEY/NEXT | 40 | Processing the template key |
|  | TMPL_KEY/NEXT | 40 | list of relent_key. The |
|  | RELENT_KEY/NEXT | 41 | relent_key is the source key of an orel. (Root is an edmm_data_stream) |
| 41 | TEMP_TMPL_KEY/NEXT | 42 | Processing a relent_key |
|  | TMPL_KEY/NEXT | 42 | which is the target key of an |
|  | RELENT_KEY/SKIP | 27 | orel. (Root is an edmm_data_stream) |
| 42 | FUN_CALL/NEXT | 2 | Processing the template key |
|  | TMPL/NEXT | 4 | list of relent_key. The |
|  | REL/NEXT | 7 | relent_key is the target key |
|  | OREL/NEXT | 36 | of an orel. (Root is an |
|  | TEMP_TMPL_KEY/NEXT | 42 | edmm_data_stream) |
|  | TMPL_KEY/NEXT | 42 |  |
|  | FINAL_STATE_ID/FINAL_STATE | 0 |  |
| 43 | RELENT_KEY/NEXT | 46 | Processing a relrel_key which is the source key of an orel. (Root is an er_data_group) |
| 44 | TEMP_TMPL_KEY/NEXT | 45 | Processing a relent_key |
|  | TMPL_KEY/NEXT | 45 | which is the source key of |
|  | RELENT_KEY/SKIP | 48 | an orel. (Root is an er_data_group) |
| 45 | TEMP_TMPL_KEY/NEXT | 45 | Processing the template key |
|  | TMPL_KEY/NEXT | 45 | list of a relent_key. The |
|  | RELENT_KEY/NEXT | 46 | relent_key is the source key of an orel. (Root is an er_data_group) |
| 46 | TEMP_TMPL_KEY/NEXT | 47 | Processing a relent_key |
|  | TMPL_KEY/NEXT | 47 | which is the target key of an |
|  | RELENT_KEY/SKIP | 29 | orel. (Root is an er_data_group) |
| 47 | TMPL/NEXT | 14 | Processing the template key |
|  | REL/NEXT | 17 | list of relent_key. The |
|  | OREL/NEXT | 317 | relent_key is the target key |
|  | TEMP_TMPL_KEY/NEXT | 47 | of an orel. (Root is an |
|  | TMPL_KEY/NEXT | 47 | er_data_group) |
|  | FINAL_STATE_ID/FINAL_STATE | 0 |  |
| 48 | RELENT_KEY/NEXT | 46 | Processing a SKIP to the end of relent source key of an orel. (Root is an er_data_group) |
| 49 | RELENT_KEY/NEXT | 41 | Processing a SKIP to the end of a relent source key of an orel. (Root is an edmm_data_stream) |

PF/Creating Data Handling Functions

To create a data handling function, perform the following steps:

1. From RM select a private tool group as the current tool group.

2. From the main panel of RM enter the option to go to the Logical View (LV).

3. Select the option to make a copy of one of the base data handling functions to your own private function.

If you are creating a Load function put EGPLOAD as the source function name and put the name of the function that you wish to create as the target function name. To create an unload function use EGPUNLD, for copy use EGPCOPY and for delete use EGPDELT for the source function name.

4. After the function has been successfully copied return to the main LV panel and enter the name of the function you just added at the top of the panel.

5. Select the option to specify your function's templates. In each template that you add make sure you add an extra field named REL_NAME that is CHAR 32 (Varying Length).

6. From the main LV panel select the option to create the connections between your templates. (Note: Your template tree can only have one root).

7. From the main LV panel select the option to change the program name from DWKLOGIC to the name of the file in which your function will reside (this can be identical to the name of the function) and change the programming language to C.

8. From the main LV panel select the option to bind the function.

9. From the main LV panel select the option to create the C-Language AIM file (H file) for the function.

10. From the main LV panel select the option to create a report on the new function.

11. Exit RM.

12. Run the EDMM-Productivity Facility program. Specify the System: CMS, MVS, etc. Specify the The FUNCTION type: UNLOAD, LOAD, DELETE, COPY, or CF.

a. Unload
  A function that retrieves a group of connected entities and relationships from the repository and translates the entity, attribute, and relationship information via the Builder function into a CDF data stream.
  This function takes any root key as input (i.e. dependent keys and/or user assigned keys).
b. Load
  A function that interprets a CDF data stream containing entity, attribute, and relationship information, updating the repository as specified by the action field of each CDF unit.
c. Delete
  A function that deletes a group of connected entity and relationship instances from the repository.
d. Copy
  A function that deletes a group of connected entity and relationship instances in the repository.
e. CF
  A function that provides data transfer and remote function routing between the work station and the host platforms.
Enter the function name (Ex. EDXUD00):
Enter the name of the function (this is the target function name used above). Enter the program name (Ex. EDXUD00C):
Enter the name of the program (this is the name that you specified earlier, it may be identical to the function name).
Enter the Aggregation name (Ex. DBD Definition):
Enter a string that names the object that the function operates on. It does not have to be a defined aggregation name.
UNLOAD generation complete ... Source code is in RM120.EDMMSRC0(MYUNLOAD) LEL is in RM120.EDMMLEL0(MYUNLOAD)

If the function is successfully created a message will indicate where the newly created source code and lel file reside.
13. After the new data handling function has created, compile the function using the C/370 compiler.
14. Link Edit the new function.

FUNCTION INVOCATION EXAMPLES

This section describes the work station steps necessary for invoking the host functions via EDMM. This description is achieved by use or examples and comments describing the behavior. Each example illustrates the use of regular parameters (input and output), a scenario on building the data for EDMM and a scenario on parsing the data returned From the function via EDMM. There are four examples: the first example demonstrates the invocation of a function without any CDF data; the second example has CDF data as input to the host function; the third has CDF data returned back from the host function; and the last example includes the use of CDF data as input and output to the host function.

Function With No CDF Data

Following is the work station activity necessary to invoke a function (DELETE) that has no special CDF data. Assume that the DELETE function interface is as follows:

| Function Name: DELETE | | |
| --- | --- | --- |
| (In) SYSKEY | Fixed | 31 |
| (In) AGG_TYPE | Char | 32 |
| (In) COMMIT | Char | 1 |
| (Out) SC | Fixed | 16 |
| (Out) CC | Char | 8 |

1. The Builder is invoked multiple times to build the data stream EDMM. Note: Only input data needs to be put in the data stream. Output parameters do not need to be built into the data stream.

TABLE 2

| | | | Building CDF Data Stream | |
| --- | --- | --- | --- | --- |
| Builder Function | ID | Action | Data-> Name<br>Data-> Value<br>Data-> Temp_Key<br>Data-> Rel_Posn | Notes |
| FIRST | EDMM_DATA_STREAM_ID | NONE | —<br>—<br>—<br>— | Tells the Builder to build a CDF data stream for EDMM |
| NEXT | FUN_CALL_ID | NONE | DELETE<br>—<br>—<br>— | Adds function name to the CDF data stream |
| NEXT | FUN_PARM_ID | NONE | SYSKEY<br>2022654<br>—<br>— | Adds SYSKEY input parameter to the CDF data stream |
| NEXT | FUN_PARM_ID | NONE | AGG_TYPE<br>DLL_DBD_DEF<br>—<br>— | Adds AGG_TYPE input parameter to the CDF data stream |
| NEXT | FUN_PARM_ID | NONE | COMMIT<br>Y<br>—<br>— | Adds COMMIT input parameter to the CDF data stream |
| WRITE_MEM | (ignored) | (ignored) | —<br>—<br>—<br>— | Builder returns address of the EDMM Data Stream. (The WRITE_FILE |

TABLE 2-continued

| | | Building CDF Data Stream | | |
|---|---|---|---|---|
| Builder Function | ID | Action | Data-> Name<br>Data-> Value<br>Data-> Temp_Key<br>Data-> Rel_Posn | Notes |
| | | | | builder function could also have been used . . . in this case the data is returned in a file specified by the caller.) |

Note:
This table emphasizes the input parameters that pertain to this scenario.

2. After creating the EDMM Data Stream, the EDMM communication function can be invoked:

*rc=egppt00(cdf_filename, & cdf_memaddr, cc);*

The cdf_filename would be a null string in this case, since the EDMM Data Stream is in the memory block pointed to by cdf_memaddr.

3. Upon completion of the DELETE function, *egppt00* returns with an output EDMM Data Stream. This information can be read via multiple invocations of the parser.

Note: The caller must release time memory for the CDF data stream returned by EDMM. A function will be provided to perform this action.

Following are the steps necessary to read the data:

TABLE 3

| | Parsing Output CDF Data Stream | | | |
|---|---|---|---|---|
| Parser Function | ID | Action | Data-> Name<br>Data-> Value<br>Data-> Temp_Key<br>Data-> Rel_Posn | Notes |
| FIRST | EDMM_DATA_STREAM_ID | NONE | —<br>—<br>—<br>— | |
| NEXT | FUN_CALL_ID | NONE | DELETE<br>—<br>—<br>— | |
| NEXT | FUN_PARM_ID | NONE | SC<br>0<br>—<br>— | |
| NEXT | FUN_PARM_ID | NONE | CC<br>CC_OK<br>—<br>— | |

Note:
This table only shows the output parameters that pertain to this scenario.

Function With CDF Data as an Input Parameter

Following is the work station activity necessary to invoke a host function that requires CDF data as input. Assume that the function interface is as follows:

| Function Name: MAINTAIN | | |
|---|---|---|
| (In) SYSKEY | Fixed | 31 |
| (In) AGG_TYPE | Char | 32 |
| (In) CDF_$MEM$ | Fixed | 32 |
| (In) CDF_FILE | Char | 46 |
| (In) COMMIT | Char | 1 |
| (Out) SC | Fixed | 16 |
| (Out) CC | Char | 8 |

1. Following are the steps necessary to build the data stream for EDMM. Note: Only input data needs to be put in the data stream.

TABLE 4

| | Building CDF Data Stream for Maintain | | | |
|---|---|---|---|---|
| Builder Function | ID | Action | Data-> Name<br>Data-> Value<br>Data-> Temp_Key<br>Data-> Rel_Posn | Notes |
| FIRST | EDMM_DATA_STREAM_ID | NONE | —<br>—<br>—<br>— | Tells the Builder to build a CDF data stream for EDMM |
| NEXT | FUN_CALL_ID | NONE | MAINTAIN<br>—<br>—<br>— | Adds function name to the CDF data stream |

TABLE 4-continued

Building CDF Data Stream for Maintain

| Builder Function | ID | Action | Data-> Name<br>Data-> Value<br>Data-> Temp_Key<br>Data-> Rel_Posn | Notes |
|---|---|---|---|---|
| NEXT | FUN_PARM_ID | NONE | SYSKEY<br>1123009<br>—<br>— | Adds SYSKEY input parameter to the CDF data stream |
| NEXT | FUN_PARM_ID | NONE | AGG_TYPE<br>DLI_DBD_DEF<br>—<br>— | Adds AGG_TYPE input parameter to the CDF data stream |
| NEXT | FUN_PARM_ID | NONE | COMMIT<br>Y<br>—<br>— | Adds COMMIT input parameter to the CDF data stream |
| NEXT | ER_DATA_GROUP | NONE | —<br>—<br>—<br>— | If the ER_DATA_GROUP has already been created, a build function of ADD_STREAM should be used to add the complete ER_DATA_GROUP data stream into the current data stream. |
| NEXT | TEMPL_ID | UPDATE | DLI_DBD<br>—<br>—<br>— | Adds template id to the CDF data stream |
| NEXT | TMPL_KEY_ID | NONE | —<br>1123009<br>—<br>— | Adds template key to the CDF data stream |
| NEXT | FIELD_ID | UPDATE | ACCESS<br>HDAM<br>—<br>— | Updates template field to the CDF data stream (These NEXT calls continue for each Template unit and Relationship) |
| WRITE_MEM | (ignored) | (ignored) | —<br>—<br>—<br>— | Builder returns address of the EDMM Data Stream. (The WRITE_FILE builder function could also have been used. In this case the data is returned in a file specified by the caller.) |

Note:
This table emphasizes the input parameters that pertain to this scenario.

It should be noted here that the CDF_FILE and CDF_MEM in the Maintain Parameter template actually refer to the host filename and the host memory location of the CDF data. Since it would be unnatural for the work station application to specify these values, the EDMM communication Facility recognizes the CDF data group associated with the function call and sets the host function parameters with the appropriate data.

2. After creating the EDMM Data Stream, the EDMM communication Facility can be invoked:

rc=egppt00 (cdf_filename, &cdf_memaddr, cc);

The cdf_filename should be a null string in this case, since the EDMM Data Stream is in the memory block pointed to by cdf_memaddr.

3. Upon return completion of the MAINTAIn Facility, egppt00 returns with an output EDMM Data Stream. This information can be read via the parser.

Note: The caller must release the memory for the CDF data stream returned by EDMM. A function will be provided to perform this action.

Following are the step necessary to read the data:

TABLE 5

Parsing Output CDF Data Stream

| Parser Function | ID | Action | Data-> Name<br>Data-> Value<br>Data-> Temp_Key<br>Data-> Rel_Posn | Notes |
|---|---|---|---|---|
| FIRST | EDMM_DATA_<br>STREAM_ID | NONE | —<br>—<br>—<br>— | |
| NEXT | FUN_CALL_ID | NONE | MAINTAIN<br>—<br>—<br>— | |
| NEXT | FUN_PARM_ID | NONE | SC<br>0<br>—<br>— | |
| NEXT | FUN_PARM_ID | NONE | CC<br>CC_OK<br>—<br>— | |

Note:
This table only shows the output parameters that pertain to this scenario.

Function with CDF Data as an Output Parameter

Following is the work station activity necessary to invoke a host function that has CDF data as Output. Assume that the function interface is as follows:

| Function Name: UNLOAD | | |
|---|---|---|
| (In) SYSKEY | Fixed | 31 |
| (In) AGG_TYPE | Char | 32 |

| -continued | | |
|---|---|---|
| Function Name: UNLOAD | | |
| (In) LOCKTYPE | Char | 8 |
| (In) HOLDLOCK | Char | 1 |
| (Out) CDF_MEM | Fixed | 32 |
| (Out) CDF_FILE | Char | 46 |
| (Out) SC | Fixed | 16 |
| (Out) CC | Char | 8 |

1. Following are the steps necessary to build the data stream for EDMM.

TABLE 6

Building CDF Data Stream for Maintain

| Builder Function | ID | Action | Data-> Name<br>Data-> Value<br>Data-> Temp_Key<br>Data-> Rel_Posn | Notes |
|---|---|---|---|---|
| FIRST | EDMM_DATA STREAM_ID | NONE | —<br>—<br>—<br>— | Tells the Builder to build a CDF data stream for EDMM |
| NEXT | FUN_CALL_ID | NONE | UNLOAD<br>—<br>—<br>— | Adds function name to the CDF data stream |
| NEXT | FUN_PARM_ID | NONE | SYSKEY<br>6674001<br>—<br>— | Adds SYSKEY input parameter to the CDF data stream |
| NEXT | FUN_PARM_ID | NONE | AGG_TYPE<br>DLI_DBD_DEF<br>—<br>— | Adds AGG_TYPE input parameter to the CDF data stream |
| NEXT | FUN_PARM_ID | NONE | LOCKTYPE<br>NOUPDATE<br>—<br>— | Adds LOCKTYPE input parameter to the CDF data stream |
| NEXT | FUN_PARM_ID | NONE | HOLDLOCK<br>N<br>—<br>— | Adds HOLDLOCK input parameter to the CDF data stream |
| WRITE_<br>FILE | (ignored) | (ignored) | —<br>—<br>—<br>— | Builder returns the data in a file whose name is specified by the caller. As in the example before, the data could have been placed |

TABLE 6-continued

| Builder Function | ID | Action | Data-> Name Data-> Value Data-> Temp_Key Data-> Rel_Posn | Notes |
|---|---|---|---|---|
| | | | | in memory if the WRITE_MEM function was employed. |

Note:
This table emphasizes the input parameters that pertain to this scenario.

Once again, it should be noted here that the CDF_FILE and CDF_MEM parameters in the UNLOAD parameter list refer to the host filename and the host memory of the CDF data. Since it would be unnatural for the work station application to specify these values, the EDMM communication Facility recognizes the CDF data group associated with the function call and sets the host function parameters with the appropriate data.

2. After creating the EDMM Data Stream, the EDMM communication Facility can be invoked:

rc=egppt00 (cdf_filename, & cdf_memaddr, cc);

The cdf_filename contains the name of the file that the user specified to the Builder for the WRITE_FILE function. The cdf_memptr should be set to NULL.

3. Upon completion of the MAINTAIn facility, egppt00 returns with an output EDMM Data Stream. This information can be read via the parser.

Note: The caller must release the memory for the CDF data stream returned by EDMM. A function will be provided to perform this action.

Following are the step necessary to read the data:

TABLE 7

| Parser Function | ID | Action | Data-> Name Data-> Value Data-> Temp_Key Data-> Rel_Posn | Notes |
|---|---|---|---|---|
| FIRST | EDMM_DATA_STREAM_ID | NONE | — — — — | |
| NEXT | FUN_CALL_ID | NONE | UNLOAD — — — | |
| NEXT | FUN_PARM_ID | NONE | SC 0 — — | |
| NEXT | FUN_PARM_ID | CC | CC_OK — — — | |
| NEXT | ER_DATA_GROUP | NONE | — — — — | |
| NEXT | TEMPL_ID | DLL_DBD | — — — — | |
| NEXT | TMPL_KEY_ID | NONE | DLL_DBD 6674001 — — | |
| NEXT | FIELD_ID | NONE | NAME DBDI — — | |
| NEXT '...' | The rest of the Templates and Relationships for the Aggregation Instance. | | | |

Note:
This table only show the output parameters that pertain to this scenario.

Function With CDF Data as Input and Output Parameters

Following is the work station activity necessary to invoke a host function that has CDF data as Output. Assume that the function interface is as follows:

| Function Name: SRCMEM | | |
|---|---|---|
| (In) SRCLIB | Char | 44 |

-continued

| Function Name: SRCMEM | | |
|---|---|---|
| (In/Out) CDF_MEM | Fixed | 32 |
| (In/Out) CDF_FILE | Char | 46 |
| (Out) SC | Fixed | 16 |
| (Out) CC | Char | 8 |

1. Following are the steps necessary to build the data stream for EDMM.

TABLE 8

Building CDF Data Stream for SRCMEM Function

| Builder Function | ID | Action | Data-> Name<br>Data-> Value<br>Data-> Temp_Key<br>Data-> Rel_Posn | Notes |
|---|---|---|---|---|
| FIRST | EDMM_DATA_STREAM_ID | NONE | —<br>—<br>—<br>— | Tells the Builder to build a CDF data stream for EDMM |
| NEXT | FUN_CALL_ID | NONE | SRCMEM<br>—<br>—<br>— | Adds function name to the CDF data stream |
| NEXT | FUN_PARM_ID | NONE | SRCLIB<br>LIB1<br>—<br>— | Adds SRCLIB input parameter to the CDF data stream |
| NEXT | FILE_DATA_GROUP_ID | NONE | —<br>—<br>—<br>— | Adds FILE DATA GROUP to the CDF data stream |
| NEXT | LINE_ID | NONE | —<br>MEMBER1<br>—<br>— | Adds member name as line unit to the CDF data stream |
| NEXT | LINE_ID | NONE | —<br>MEMBER2<br>—<br>— | Adds member name as line unit to the CDF data stream |
| NEXT | LINE_ID | NONE | —<br>MEMBERn<br>—<br>— | Adds member name as line unit to the CDF data stream |
| WRITE_FILE | (ignored) | (ignored) | —<br>—<br>—<br>— | Builder returns the data in a file whose name is specified by the caller. The data would have been placed in memory if the WRITE_MEM function was employed. |

Note:
This table emphasizes the input parameters that pertain to this scenario.

Once again, it should be noted here that CDF_FILE and CDF_MEM parameters in the SRCMEM parameter list refer to the host filename and the host memory location of the CDF data. Since it would be unnatural liar the Work station application to specify these values, the EDMM communication Facility recognizes the File data group associated with the function call and sets the host function parameters with the appropriate data.

2. After creating the EDMM Data Stream, the EDMM communication Facility can be invoked:

$$rc = egppt00 \ (cdf\_file, \ \& \ cdf\_memaddr, \ cc);$$

The cdf_filename must contain the name of the file that the user specified to the builder for the WRITE_FILE function. The cdf_memptr should be set to NULL.

3. Upon return completion of the SRCMEM function, egppt00 returns with an output EDMM Data Stream. This information can be read via the parser.

Note: The caller must release the memory for the CDF data stream returned by EDMM. A function will be provided to perform this action.

Following are the steps necessary to read the data:

TABLE 9

Parsing Output CDF Data Stream

| Parser Function | ID | Action | Data-> Name<br>Data-> Value<br>Data-> Temp_Key<br>Data-> Rel_Posn | Notes |
|---|---|---|---|---|
| FIRST | EDMM_DATA_STREAM_ID | NONE | —<br>—<br>— | |
| NEXT | FUN_CALL_ID | NONE | SRCMEM | |

TABLE 9-continued

Parsing Output CDF Data Stream

| Parser Function | ID | Action | Data-> Name<br>Data-> Value<br>Data-> Temp_Key<br>Data-> Rel_Posn | Notes |
|---|---|---|---|---|
| | | | — | |
| | | | — | |
| | | | — | |
| NEXT | FUN_PARM_ID | NONE | SC | |
| | | | 0 | |
| | | | — | |
| NEXT | FUN_PARM_ID | NONE | CC | |
| | | | CC_OK | |
| | | | — | |
| NEXT | FILE_DATA_GROUP | NONE | — | |
| | | | — | |
| | | | — | |
| NEXT | LINE_ID | NONE | — | |
| | | | Lib2 | |
| | | | — | |
| | | | — | |

Note:
This table only show the output parameters that pertain to this scenario.

Using the foregoing specifications the invention may be implemented using standard programming techniques. The resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a system. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. In a data processing system having stored units of entity/relationship data, a computer-implemented method comprising the steps of:
    reading said units of entity/relationship data;
    encoding the units of entity/relationship data into an er_data element according to a set of grammatical rules wherein length represents a number of bytes or words and other terminal elements are arbitrary unique values; and
    storing the er_data element;

wherein the set of grammatical rules include:

| | | |
|---|---|---|
| <er_data> | ::= | <template> \| <rel> |
| <template> | ::= | length <crud_action><br>tmpl_id template_name<br><tmpl_key_list> <field_list> |
| <tmpl_key_list> | ::= | <tmpl_key> <tmpl_key_list> \|<br><tmpl_key> |
| <tmpl_key> | ::= | length <no_action> temp_tmpl_key_id<br><temp_key> \| length <no_action><br>tmpl_key_id key_value |
| <field_list> | ::= | <field> <field_list> \| <NULL> |
| <field> | ::= | length <crud_action><br>field_id field_name field_value |
| <rel> | ::= | length <crd_action> rel_id<br><rel_key> <source_key><br><target_key> \| length <cu_action><br>orel_id <rel_key> <rel_posn><br><source_key> <target_key> |
| <source_key> | ::= | <relent_key> \| <relrel_key> |
| <target_key> | ::= | <relent_key> \| <relrel_key> |
| <relent_key> | ::= | length <no_action><br>relent_key_id template_name<br><tmpl_key_list> |
| <relrel_key> | ::= | length <no_action><br>relrel_key_id rel_key |
| <crud_action> | ::= | create \| read \| update \| delete |
| <cu_action> | ::= | create \| update |
| <crd_action> | ::= | create \| read \| delete |
| <c_action> | ::= | create |
| <no_action> | ::= | none |
| <temp_key> | ::= | unique_key |
| <rel_key> | ::= | unique_key |
| <rel_posn> | ::= | unique_key \| 0. |

2. The method of claim 1 further comprising the steps of:
    determining the length of the er_data element;
    encoding er_data into an er_data_group; and
    storing the er_data_group;
    wherein the grammatical rules further include:

| | | |
|---|---|---|
| <er_data_group> | ::= | length <no_action> er_data_group_id <er_data_list> |
| <er_data_list> | ::= | <er_data> <er_data_list> \| <er_data> [; and] |
| | | [storing the er_data_group]. |

3. The method of claim 2, the system having stored data for function calls and parameters, further comprising the steps of:
    encoding a function_call from the function calls and parameters wherein fun_name is a name of a function being invoked, fun_parm_name is a name of a function parameter, and fun_parm_value is a value of the parameter; and
    storing the function_call with the er_data_group;
    wherein the set of grammatical rules further includes the rules:

```
<function_call>        ::= length <no_action> fun_call_id fun_name <fun_parm_list>
<fun_parm_list>        ::= <fun_parm> <fun_parm_list> | <NULL>
<fun_parm>             ::= length <no_action> fun_parm_id fun_parm_name
                           fun_parm_value[; and]
    [storing the function_call with the er_data_group].
```

4. The method of claim 3, the system having data stored as lines in files having a plurality of records, further comprising the steps of:
reading the lines of a file;
encoding a file_data_group from the lines wherein line_value refers to a record and length refers to a number of bytes in a element;
storing the file_data_group with the function_call and the er_data_group;
wherein the set of grammatical rules includes:

```
<file_data_group>   ::= length <no_action> file_data_group_id <file_data_list>
<file_data_list>    ::= <line> <file_data_list> | <line>
<line>              ::= length <no_action> line_id line_value[; and]
    [storing the file_data_group with the function_call and the er_data_group].
```

5. The method of claim 4, further comprising the steps of:
encoding a cdf_data_stream from the er_data_group, file_data_group, and function_call; and
storing the cdf_data_stream;
wherein the set of grammatical rules includes:

```
<cdf_data_stream>   ::= <edmm_data_stream> | <er_data_group> |
                        <file_data_group>
<edmm_data_stream>  ::= length <no_action> edmm_data_stream_id
                        <edmm_data_list>
<edmm_data_list>    ::= <edmm_data> <edmm_data_list> |
                        <edmm_data>
<edmm_data>         ::= <function_call> | <function_call>
                        <er_data_group> |
                        <function_call> <file_data_group>[; and]
    [storing the cdf_data_stream].
```

6. The method of claim 5 further comprising the step of transmitting the cdf_data_stream to a remote computer.

7. The method of claim 6 further comprising the step of parsing the cdf_data_stream in the remote computer into separate units of data.

8. The method of claim 7 further comprising the steps performed in the remote computer of:
detecting a function call;
routing the function call to a function processing means;
capturing output from the function processing means;
building the output into an output cdf_data_stream; and
transmitting the output cdf_data_stream to the system.

9. The method of claim 8 further comprising the step of parsing by the system of the output cdf_data_stream to recover the output.

* * * * *